(12) United States Patent
Forbes et al.

(10) Patent No.: US 6,737,887 B2
(45) Date of Patent: May 18, 2004

(54) CURRENT MODE SIGNAL INTERCONNECTS AND CMOS AMPLIFIER

(75) Inventors: Leonard Forbes, Corvallis, OR (US); Kie Y. Ahn, Chappaqua, NY (US)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 09/898,688

(22) Filed: Jul. 3, 2001

(65) Prior Publication Data

US 2001/0035770 A1 Nov. 1, 2001

Related U.S. Application Data

(62) Division of application No. 09/247,680, filed on Feb. 9, 1999, now Pat. No. 6,255,852.

(51) Int. Cl.[7] .......................................... H03K 19/0175
(52) U.S. Cl. .............................. 326/86; 326/30; 326/27
(58) Field of Search ............................ 326/30, 26, 27, 326/83, 86

(56) References Cited

U.S. PATENT DOCUMENTS

| | | | |
|---|---|---|---|
| 3,816,673 A | 6/1974 | Miya | 179/170 R |
| 3,923,567 A | 12/1975 | Lawrence | 156/7 |
| 3,959,047 A | 5/1976 | Alberts et al. | 156/8 |
| 3,982,268 A | 9/1976 | Anthony et al. | 357/55 |
| 4,081,701 A | 3/1978 | White, Jr. et al. | 307/355 |
| 4,308,421 A | 12/1981 | Bogese, II | 174/32 |
| 4,372,032 A | 2/1983 | Collins et al. | 438/285 |
| 4,394,712 A | 7/1983 | Anthony | 361/411 |
| 4,595,428 A | 6/1986 | Anthony et al. | 148/187 |
| 4,601,021 A | 7/1986 | Paul et al. | 364/521 |
| 4,631,636 A | 12/1986 | Andrews | 361/385 |

(List continued on next page.)

FOREIGN PATENT DOCUMENTS

| | | | |
|---|---|---|---|
| JP | 4-133472 | 5/1992 | |
| JP | 05-129666 | 5/1993 | |
| WO | WO-94/05039 | 3/1994 | H01L/23/48 |

OTHER PUBLICATIONS

Blalock, T.N., et al., "A High–Speed Clamped Bit–Line Current–Mode Sense Amplifier", *IEEE Journal of Solid–State Circuits*, 26(4), pp. 542–548, (Apr., 1991).

(List continued on next page.)

*Primary Examiner*—Don Le
(74) *Attorney, Agent, or Firm*—Schwegman, Lundberg, Woessner & Kluth, P.A.

(57) ABSTRACT

This invention provides a structure and method for improved transmission line operation on integrated circuits. A first embodiment of this invention provides a current mode signaling technique over transmission lines formed having a lower characteristic impedance than conventional CMOS transmission lines. The low impedance transmission lines of the present invention are more amenable to signal current interconnections over longer interconnection lines. An interconnection on an integrated circuit is described in which a first end of a transmission line is coupled to a driver. The transmission line is terminated at a second end with a low input impedance CMOS technology. In one embodiment, the low input impedance CMOS technology is a current sense amplifier which is input impedance matched to the transmission line. This minimizes reflections and ringing, cross talk and noise as well as allows for a very fast interconnection signal response.

A second embodiment of the present invention includes a novel current sense amplifier in which feedback is introduced to lower the input impedance of the current sense amplifier. In this embodiment, the novel current sense amplifier is employed together with the current signaling technique of the present invention. The novel low input impedance CMOS circuit described here provides an improved and efficiently fabricated technique for terminating low impedance transmission lines on CMOS integrated circuits.

50 Claims, 10 Drawing Sheets

U.S. PATENT DOCUMENTS

| | | | | |
|---|---|---|---|---|
| 4,640,871 A | 2/1987 | Hayashi et al. | | 428/611 |
| 4,653,025 A | 2/1987 | Minato et al. | | 365/154 |
| 4,710,798 A | 12/1987 | Marcantonio | | 357/80 |
| 4,713,841 A | 12/1987 | Porter et al. | | 455/608 |
| 4,739,446 A | 4/1988 | Landis | | 361/385 |
| 4,749,888 A | 6/1988 | Sakai et al. | | 326/4 |
| 4,870,470 A | 9/1989 | Bass, Jr. et al. | | 357/23.5 |
| 4,933,743 A | 6/1990 | Thomas et al. | | 357/71 |
| 4,962,476 A | 10/1990 | Kawada | | 365/53 |
| 4,977,439 A | 12/1990 | Esquivel et al. | | 357/49 |
| 5,019,728 A | * 5/1991 | Sanwo et al. | | 326/86 |
| 5,061,987 A | 10/1991 | Hsia | | 357/71 |
| 5,073,771 A | 12/1991 | Satta et al. | | 340/721 |
| 5,079,618 A | 1/1992 | Farnworth | | 357/81 |
| 5,128,962 A | 7/1992 | Kerslake et al. | | 345/7 |
| 5,135,889 A | 8/1992 | Allen | | 437/195 |
| 5,153,814 A | 10/1992 | Wessely | | 361/382 |
| 5,165,046 A | 11/1992 | Hesson | | 307/270 |
| 5,168,334 A | 12/1992 | Mitchell et al. | | 257/324 |
| 5,223,808 A | 6/1993 | Lee et al. | | 333/24.1 |
| 5,229,327 A | 7/1993 | Farnworth | | 437/209 |
| 5,258,648 A | 11/1993 | Lin | | 257/778 |
| 5,258,658 A | 11/1993 | Lin | | 257/778 |
| 5,275,001 A | 1/1994 | Yokotani et al. | | 62/3.7 |
| 5,313,361 A | 5/1994 | Martin | | 361/699 |
| 5,317,197 A | 5/1994 | Roberts | | 257/401 |
| 5,343,366 A | 8/1994 | Cipolla et al. | | 361/785 |
| 5,352,998 A | 10/1994 | Tanino | | 333/247 |
| 5,362,976 A | 11/1994 | Suzuki | | 257/81 |
| 5,363,550 A | 11/1994 | Aitken et al. | | 29/828 |
| 5,391,917 A | 2/1995 | Gilmour et al. | | 257/690 |
| 5,392,407 A | 2/1995 | Heil et al. | | 395/325 |
| 5,409,547 A | 4/1995 | Watanabe et al. | | 136/204 |
| 5,415,699 A | 5/1995 | Harman | | 138/238 |
| 5,432,823 A | 7/1995 | Gasbarro et al. | | 375/356 |
| 5,438,224 A | 8/1995 | Papageorge et al. | | 257/777 |
| 5,450,026 A | 9/1995 | Morano | | 326/84 |
| 5,468,681 A | 11/1995 | Pasch | | 437/183 |
| 5,510,758 A | 4/1996 | Fujita et al. | | 333/247 |
| 5,521,536 A | * 5/1996 | Yamashita et al. | | 326/30 |
| 5,532,506 A | 7/1996 | Tserng | | 257/276 |
| 5,567,654 A | 10/1996 | Beilstein, Jr. et al. | | 437/209 |
| 5,574,923 A | 11/1996 | Heeb et al. | | 395/800 |
| 5,587,119 A | 12/1996 | White | | 264/104 |
| 5,598,031 A | 1/1997 | Groover et al. | | 257/668 |
| 5,598,039 A | 1/1997 | Weber | | 307/38 |
| 5,610,366 A | 3/1997 | Fleurial et al. | | 136/202 |
| 5,618,752 A | 4/1997 | Gaul | | 438/626 |
| 5,619,159 A | * 4/1997 | Sasaki et al. | | 327/527 |
| 5,622,875 A | 4/1997 | Lawrence | | 438/691 |
| 5,633,962 A | 5/1997 | Kurata | | 385/24 |
| 5,637,828 A | 6/1997 | Russell et al. | | 174/52.2 |
| 5,646,067 A | 7/1997 | Gaul | | 437/180 |
| 5,656,548 A | 8/1997 | Zavracky et al. | | 438/23 |
| 5,657,481 A | 8/1997 | Farmwald et al. | | 395/551 |
| 5,682,062 A | 10/1997 | Gaul | | 257/686 |
| 5,692,558 A | 12/1997 | Hamilton et al. | | 165/80.4 |
| 5,699,291 A | 12/1997 | Tsunemine | | 365/149 |
| 5,714,791 A | 2/1998 | Chi et al. | | 257/467 |
| 5,729,047 A | 3/1998 | Ma | | 257/664 |
| 5,747,728 A | 5/1998 | Fleurial et al. | | 136/203 |
| 5,753,529 A | 5/1998 | Chang et al. | | 437/67 |
| 5,767,001 A | 6/1998 | Bertagnolli et al. | | 438/455 |
| 5,772,153 A | 6/1998 | Abaunza et al. | | 244/134 F |
| 5,781,746 A | 7/1998 | Fleck | | 395/306 |
| 5,786,628 A | 7/1998 | Beilstein, Jr. et al. | | 257/684 |
| 5,807,783 A | 9/1998 | Gaul et al. | | 438/406 |
| 5,811,984 A | 9/1998 | Long et al. | | 326/30 |
| 5,821,624 A | 10/1998 | Pasch | | 257/776 |
| 5,834,799 A | 11/1998 | Rostoker et al. | | 257/98 |
| 5,855,735 A | 1/1999 | Takada et al. | | 156/636.1 |
| 5,861,666 A | 1/1999 | Bellaar | | 257/686 |
| 5,880,601 A | * 3/1999 | Kanazawa et al. | | 326/68 |
| 5,901,050 A | 5/1999 | Imai | | 361/820 |
| 5,902,118 A | 5/1999 | Hubner | | 438/106 |
| 5,903,018 A | 5/1999 | Shimawaki | | 257/198 |
| 5,903,045 A | 5/1999 | Bertin et al. | | 257/621 |
| 5,910,684 A | * 6/1999 | Sandhu et al. | | 257/758 |
| 5,915,167 A | 6/1999 | Leedy | | 438/108 |
| 5,990,550 A | 11/1999 | Umezawa | | 257/712 |
| 5,990,564 A | 11/1999 | Degani et al. | | 257/778 |
| 5,991,161 A | 11/1999 | Samaras et al. | | 361/760 |
| 6,016,256 A | 1/2000 | Crane, Jr. et al. | | 361/813 |
| 6,022,787 A | 2/2000 | Ma | | 438/422 |
| 6,075,383 A | 6/2000 | Terletzki | | 326/86 |
| 6,133,621 A | 10/2000 | Gaibotti et al. | | 257/659 |
| 6,137,164 A | 10/2000 | Yew et al. | | 257/686 |
| 6,143,616 A | 11/2000 | Geusic et al. | | 438/389 |
| 6,219,237 B1 | 4/2001 | Geusic et al. | | 361/699 |
| 6,223,273 B1 | 4/2001 | Kanekawa et al. | | 712/33 |
| 6,226,599 B1 | 5/2001 | Namiki | | 702/57 |
| 6,255,852 B1 | 7/2001 | Forbes et al. | | 326/86 |
| 6,281,042 B1 | 8/2001 | Ahn et al. | | 438/108 |
| 6,373,740 B1 | 4/2002 | Forbes et al. | | 365/51 |
| 6,420,778 B1 | 7/2002 | Sinyansky | | 257/664 |
| 6,433,408 B1 | 8/2002 | Anjo et al. | | 257/664 |
| 6,545,338 B1 | 4/2003 | Bothra et al. | | 257/508 |
| 6,569,757 B1 | 5/2003 | Weling et al. | | 438/618 |
| 6,570,248 B1 | 5/2003 | Ahn et al. | | 257/724 |
| 6,600,339 B2 | 7/2003 | Forbes et al. | | 326/86 |
| 2001/0000428 A1 | 4/2001 | Abadeer et al. | | 333/33 |
| 2003/0176023 A1 | 9/2003 | Forbes et al. | | 438/186 |
| 2003/0176050 A1 | 9/2003 | Forbes et al. | | 438/598 |

OTHER PUBLICATIONS

Blalock, T.N., et al., "A High–speed Sensing Scheme for 1T Dynamic RAMs Utilizing the Clamped Bit–line Sense Amplifier", *IEEE Journal of Solid–State Circuits*, 27(4), 618–625, (Apr., 1992).

Emeigh, R., et al., "Fully Integrated LVD Clock Generation/Distribution IC", *IEEE Custom Integrated Circuits Conference*, Santa Clara, pp. 53–56, (1997).

Gabara, T.J., et al., "Digitally Adjustable Resistors in CMOS for High–Performance Applications", *IEEE Journal of Solid–State Circuits*, 27(8), 1176–1185, (1992).

Gunning, B., et al., "A CMOS Low–Voltage–Swing Transmission–Line Transceiver", *Digest of Technical Papers— IEEE International Solid State Circuits Conference*, San Francisco, CA, pp. 58–59, (1992).

Johnson, H.W., et al., "High Speed Digital Design", *A Handbook of Black Magic*, Prentice Hall PTR, Upper Saddle River, New Jersey, pp. 422 & 426, (1993).

Rabaey, J.M., *Digital Integrated Circuits, A Design Perspective*, Prentice Hall, Upper Saddle River, New Jersey, ISBN 0–13–178609–1, pp. 482–493, (1996).

Ramo, S., et al., "Fields and Waves in Communication Electronics", *John Wiley & Sons, Inc., New York, 3rd ed.*, 428–433, (1994).

Seevinck, E., et al., "Current–Mode Techniques for High–Speed VLSI Circuits with Application to Current Sense Amplifier for CMOS SRAM's", *IEEE Journal of Solid State Circuits*, 26(4), pp. 525–536, (Apr. 1991).

Hsu, et al., "Low temperature fired NiCuZn ferrite", *IEEE Transactions on Magnetics*, 30 (6), (1994), 4875–4877.

Senda, M., "Permeability Measurement of Soft Magnetic Films at High Frequency and Multilayering Effect", *IEEE Translation Journal on Magnetics in Japan*, vol. 8, No. 3, (Mar. 1993), pp. 161–168.

Zhang, Hongguo, et al., "Investigation on Structure and Properties of Low–Temperature Sintered Composite Ferrites", *Materials Research Bulletin*, 35, (2000), 2207–2215.

Zhenxing, Yue, et al., "Low–Temperature Sinterable Cordicrite Glass–ceramics", *High Technology Letters (China)*, 10 (115), (2000), 96–97.

Arnoldussen, Thomas C., "A Modular Transmission Line/Reluctance Head Model", *IEEE Transactions on Magnetics*, vol. 24, (Nov. 1988), pp. 2482–2484.

Beddingfield, C., et al., "Flip Chip Assembly of Motorola Fast Static RAM Know Good Die", *1997 Proceedings, 47th Electronic Components and Technology Conference*, San Jose, CA, (May 18–21, 1997), pp. 643–648.

Cao, L., et al., "A Novel"Double–Decker" Flip–Chip/BGA Package for Low Power Giga–Hertz Clock Distribution", *1997 Proceedings, 47th Electronic Components and Technology Conference*, San Jose, CA, (May 18–21, 1997), pp. 1152–1157.

Crisp, R., "Development of Single–Chip Multi–GB/s DRAMs", *Digest of International Solid–State Circuits Conference*, (1997), pp. 226–227.

Crisp, R., "Rambus Technology, the Enabler", *Conference Record of Wescon*, Anaheim, CA, (Nov. 17–19, 1992), pp. 160–165.

Demmin, J., "nCHIP's Silicon Circuit Board Technology", *National Electronic Packaging and Production Conference, NEPCON West 94, 3*, Proceedings of the Technical Program, (1993), pp. 2038–2039.

Donnelly, K. S., et al., "A 660MB/s Interface Megacell Portable Circuit in –.3 mum–0.7 mum CMOS ASIC", *IEEE Journal of Solid–State Circuits*, vol. 32, (Dec. 1996), pp. 1995–2003.

Feinberg, I., et al., "Interposer for Chip–on–Chip Module Attachment", *IBM Technical Disclosure Bulletin*, 26(9), (Feb. 1984), pp. 4590–4591.

Foster, R., et al., "High Rate Low–Temperature Selective Tungsten", *In: Tungsten and Other Refractory Metals for VLSI Applications III*, V.A. Wells, ed., Materials Res. Soc., Pittsburgh, PA, (1988), pp. 69–72.

Goodman, T., et al., "The Flip Chip Market", *Advanced Packaging*, (Sep./Oct. 1997), pp. 24–25.

Gray, P. R., et al., "Analysis and Design of Analog and Integrated Circuits", *John Wiley and Sons, 2nd ed.*, (1984), pp. 617–622.

Heremans, P., et al., "Optoelectronic Integrated Receiver for Inter–MCM and Inter–Chip Optical Interconnects", *Technical Digest, International Electron Devices Meeting*, (Dec. 1996), pp. 657–660.

Horie, H., et al., "Novel High Aspect Ratio Aluminum Plug for Logic/DRAM LSI's Using Polysilicon–Aluminum Substitute", *Technical Digest: IEEE International Electron Devices Meeting*, San Francisco, CA,(1996), pp. 946–948.

Horowitz, M., et al., "PLL Design for a 500mbs Interface", *Dig. International Solid–State Circuits Conference*, (1993), pp. 160–161.

Hsu, Yimin, et al., "High frequency field permeability of patterned Ni80Fe20 and Ni45Fe55 thin films", *Journal of Applied Physics*, (Jun. 2001), pp. 6808–6810.

Huth, N., "Next–Generation Memories", *Electronik, 42(23)*, (1993), pp. 36–44.

Johnson, H., *In: A Handbook of Black Magic*, Prentice–Hall. Inc., New Jersey, ISBN 0–13–395724–1,(1993), pp. 66–71, 194–197.

Krishnamoorthy, A. V., et al., "Ring Oscillators with Optical and Electrical Readout Based on Hybrid GaAs MQW Modulators Bonded to 0.8 Micron Silicon VLSI Cricuits", *Electronics Lett. 31(22)*, (Oct. 26, 1995), pp. 1917–1918.

Lee, T. H., et al., "A 2.5V Delay–Locked Loop for an 18Mb 500MB/s DRAM", *Digest of International Solid–State Circuits Conference*, (1994), pp. 300–301.

Lee, K., et al., "Modeling and Analysis of Multichip Module Power Supply Planes", *IEEE*, (1995), pp. 628–639.

Lee, K., "On–Chip interconnects —gigahertz and beyond", *Solid State Technology*, (1998), pp. 85–88.

Lehmann, V., "The Physics of Macropore Formation in Low Doped n–Type Silicon", *Journal of the Electrochemical Society, 140(10)*, (Oct. 1993), pp. 2836–2843.

Lin, C. M., et al., "Precision Embedded Thin Film Resistors for Multichip Modules (MCM–D)", *Proceedings IEEE Multichip Module Conference*, (1997), pp. 44–9.

Mimura, T., et al., "System Module: a New Chip–on–Chip Module Technology", *Proceedings of 1997 IEEE Custom Integrated Circuit Conference*, (1997), pp. 439–442.

Muller, K., et al., "Trench Storage Node Technology for Gigabit DRAM Generations", *Digest IEEE International Electron Devices Meeting*, San Francisco, CA,(Dec. 1996), pp. 507–510.

Ohba, T., et al., "Evaluation on Selective Deposition of CVD W Films by Measurement of Surface Temperature", *In: Tungsten and Other Refractory Metals for VLSI Applications II*, Materials Research Society, Pittsburgh, PA,(1987), pp. 59–66.

Ohba, T., et al., "Selective Chemical Vapor Deposition of Tungsten Using Silane and Polysilane Reductions", *In: Tungsten and Other Refractory Metals for VLSI Applications IV*, Materials Research Society, Pittsburgh, PA, (1989), pp. 17–25.

Patel, N. G., et al., "Thermoelectric Cooling Effect in a p–Sb2Te3/n–Bi2Te3 Thin Film Thermocouple", *Solid–State Electronics 35(9)*, (1992), pp. 1269–1272.

Rucker, T. G., et al., "A High Performance SI on SI Multichip Module Technology", *1992 Symposium on VLSI Technology. Digest of Technical Papers, IEEE*, Japanese Society of Applied Physics, 1992 Seattle, WA,(Jun. 2–4, 1992), pp. 72–73.

Sekine, et al., "A New High–Density Plasma Etching System Using a Dipole–Ring Magnet", *Jpn. J. Appl. Phys., Pt. 1, No. 11*, (Nov. 1995), pp. 6274–6278.

Seraphim, D. P., et al., "Principles of Electronic Packaging.", *In: Principles of Electronic Packaging.*McGraw–Hill, New York, NY, (1989), pp. 44, 190, 595–597.

Shafai, C., et al., "A Micro–Integrated Peltier Heat Pump for Localized On–chip Temperature Control.", *Canadian Journal of Physics, 74, Suppl., No. 1*, (1996), S139–142.

Shafai, C., et al., "Optimization of Bi2Te3 Thin Films for Microintegrated Peltier Heat Pumps", *Journal of Vacuum Science and Technology A, Second Series 15, No. 5*, Preliminary Program, 44th National Symposium of the AVS, San Jose, CA,(Sep./Oct. 1997), pp. 2798–2801.

Su, D. K., et al., "Experimental Results and Modeling Techniques for Substrate Noise in Mixed–Signal Integrated Circuits", *IEEE Journal of Solid–State Circuits, 28(4)*, (Apr. 1993), pp. 420–430.

Thomas, M., et al., "VLSI Multilevel Micro–Coaxial Interconnects for High Speed Devices", *IEEE*, (1990),4 pages.

Vardaman, E. J., et al., "CSPs: Hot new packages for cool portable products", *Solid State Technology, 40(10)*, (Oct. 1997), pp. 84–89.

Vendier, O., et al., "A 155 Mbps Digital Transmitter Using GaAs Thin Film LEDs Bonded to Silicon Driver Circuits", *Digest IEEE/LEOS 1996 Summer Topical Meetings, Advanced Applications of Lasers in Materials and Processing*,(1996), pp. 15–16.

Vusirikala, V., et al., "Flip–chip Optical Fiber Attachment to a Monolithic Optical Receiver Chip", *SPIE Proceedings (The International Society for Optical Engineering), 2613*, (Oct. 24, 1995), pp. 52–58.

Webb, Bucknell C., et al., "High–frequency permeability of laminated and unlaminated, narrow, thin–film magnetic stripes (invited)", *Journal of Applied Physics*, (1991),pp. 5611, 5613, 5615.

Webb, Bucknell C., et al., "The high field, high frequency permeability of narrow, thin–film magnetic stripes", *IEEE Transactions of Magnetics*, vol. 27,(1991),pp. 4876–4878.

* cited by examiner

CURRENT MODE SIGNAL INTERCONNECTS AND CMOS AMPLIFIER

This application is a Divisional of U.S. application Ser. No. 09/247,680, filed Feb. 9, 1999 is now a U.S. Pat. No. 6,255,852.

FIELD OF THE INVENTION

The present invention relates generally to integrated circuits. More particularly, it pertains to structure and methods for improved transmission line interconnections.

BACKGROUND OF THE INVENTION

The metal lines over insulators and ground planes, or metal lines buried in close proximity to dielectric insulators and used for integrated circuit interconnects are in reality transmission lines or strip lines. The use of coaxial interconnection lines for interconnections through the substrate in CMOS integrated circuits can also be termed transmission lines or strip lines. Interconnection lines on interposers or printed circuit boards can also be described as transmission lines.

Most CMOS integrated circuit interconnections rely on the transmission of a voltage step or signal across transmission lines. The driver on one end of the transmission line may simply be a CMOS inverter and the receiver a simple CMOS amplifier, differential amplifier or comparator. A voltage sense amplifier serving as the CMOS receiver presents a high impedance termination or load to the interconnection line. Most commonly used coaxial lines have an impedance of only 50 ohms or 75 ohms. This fact is problematic for several identifiable reasons. In example, the high impedance termination is troublesome because the switching time response or signal delay is determined mainly by the ability of the driver to charge up the capacitance of the transmission line to neighboring transmission lines or conducting substrates as well as the load capacitance of the voltage sense amplifier. Switching times in CMOS circuits have been limited by the ability to switch the capacitive loads of long lines and buffers, and charge these capacitances over large voltage swings to yield a voltage step signal. Also, the transmission line is generally not terminated by its characteristic impedance (i.e. impedance matched) resulting in reflections and ringing. Large noise voltages may be induced on the signal transmission line due to capacitive coupling and large voltage switching on adjacent lines. The noise voltage can be a large fraction of the signal voltage. The prior art has been to for the most part not to impedance match transmission lines. Instead, in a CMOS process the transmission lines simply terminate with a voltage sense amplifier. This is due to the fact that impedance matching with low impedance resistors is difficult to achieve in CMOS technology.

In contrast, transmission lines are generally impedance matched in ECL circuits. Low impedance resistor terminations are more easily achievable in a bipolar process. The result is that ECL gates have very low input impedances (Zin) looking back into the emitters of the emitter follower inputs (Zin=1/gm). Bipolar transistors have a large transconductance gm=(q/kT) (Idc) determined by the dc emitter current (Idc) so a low impedance is easily achieved, either in matching the sending or receiving end impedances. Matched transmission lines provide better noise immunity with smaller voltage swings on the lines. Unfortunately, ECL circuits consume large amounts of power and are not applicable in a CMOS process.

Some earlier research has explored current-mode sensing in SRAM circuits with d-c sensible signal currents, and which can also be applied to charge sensing in one-transistor dynamic RAMs (DRAMs). A subnanosecond sense-amplifier response time that is essentially independent of bit-line capacitance was accomplished by relocating the large bit-line capacitance to a node within the sense amplifier. Due to the small impedance at the sensing node, the signal from the memory cell can be injected into the sense amplifier with only minimal charging or discharging of the bit-line capacitance. As a result, the voltage change on the bit line during the sense portion of a cell read access was extremely low, and this eliminates the source of most voltage noise coupling problems and minimizes the power supply bounce during sensing. The subnanosecond sense-amplifier response time, however, is probably not sensitive enough for application in today's fastest CMOS DRAM circuits.

Another problem to solve concerning integrated circuit interconnection lines is clock skew. In high frequency circuits, clock skew can be avoided by using terminated transmission lines for clock synchronization signals. Again, correctly terminating such transmissions in the CMOS technology poses complications.

One approach describes how CMOS circuits can be adjusted digitally to generate controlled impedances for use in high-performance circuits. Since these CMOS circuits only require digital signals to operate, on-chip dc power can be reduced and impedance can be adjusted by manipulating the digital control information. This technique can also be used in terminating transmission lines on-chip, constant delay lines, and controlled di/dt output buffers. This simple solution is unavailable, however, for implementation with combined analog/digital circuit designs.

Transmission line performance is becoming more critical on the fastest CMOS integrated circuits where the signal rise time is becoming comparable to the signal delay on long interconnection lines even on the integrated circuit die itself.

For the reasons stated above, and for other reasons stated below which will become apparent to those skilled in the art upon reading and understanding the present specification, it is desirable to develop improved performance for transmission lines fabricated according to a CMOS process.

SUMMARY OF THE INVENTION

The above mentioned problems with CMOS line interconnections as well as other problems are addressed by the present invention and will be understood by reading and studying the following specification. Current mode line interconnections are provided which accord exemplary performance.

A first embodiment of this invention provides a current mode signaling technique over low impedance transmission lines. Low impedance transmission lines such as those which exist on CMOS integrated circuits are more amenable to current signaling over longer transmission lines. These longer transmission lines may be on the CMOS integrated circuit itself, an interconnection line between integrated circuits mounted in a module as for instance a memory module, an interposer upon which these integrated circuits are mounted, or on a printed circuit board upon which the integrated circuits are mounted. An interconnection on an integrated circuit is described in which a first end of a transmission line is coupled to a driver. The transmission line has a low characteristic impedance. The transmission line is terminated at a second end with a low input impedance CMOS technology. In one embodiment, the low input impedance CMOS technology is a current sense amplifier. This minimizes reflections and ringing, cross talk and noise as well as allows for a very fast interconnection signal response.

A second embodiment of the present invention includes a novel current sense amplifier in which feedback is introduced to lower the input impedance of the current sense amplifier. In this embodiment, the novel current sense amplifier is employed together with the current signaling technique of the present invention. The novel low input impedance CMOS circuit described here provides an improved and efficiently fabricated technique for terminating low impedance transmission lines on CMOS integrated circuits. In addition, the novel low input impedance CMOS circuit offers the following advantages: (1) the signal delay depends only on the velocity of light on the line and is easily predictable and reproducible, eliminating or allowing for compensation for signal and/or clock skew, (2) there are no reflections at the receiving end of the line and this minimizes ringing, and (3) noise signals will be smaller due to weaker coupling between lines resulting in better signal to noise ratios, the noise current will only be a small fraction of the signal current.

These and other embodiments, aspects, advantages, and features of the present invention will be set forth in part in the description which follows, and in part will become apparent to those skilled in the art by reference to the following description of the invention and referenced drawings or by practice of the invention. The aspects, advantages, and features of the invention are realized and attained by means of the instrumentalities, procedures, and combinations particularly pointed out in the appended claims.

DETAILED DESCRIPTION

Figure 1A:
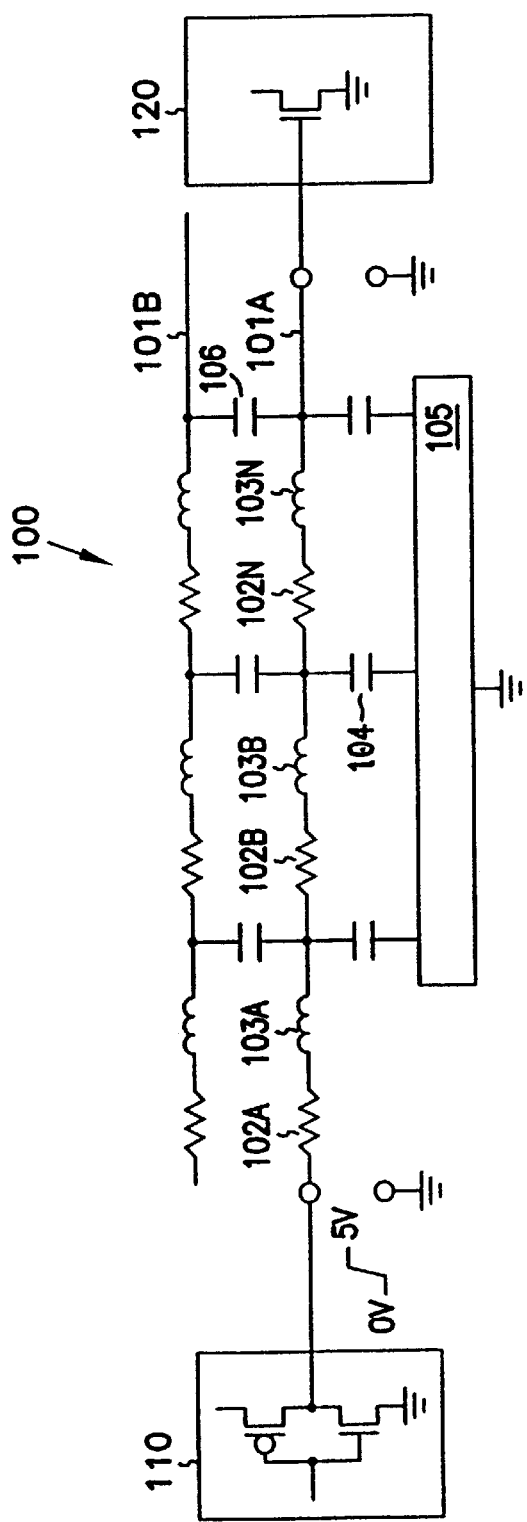
FIG. 1A shows an integrated circuit in which a transmission line interconnects a driver to a receiver.

In the following detailed description of the invention, reference is made to the accompanying drawings which form a part hereof, and in which is shown, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention.

The terms wafer and substrate used in the following description include any structure having an exposed surface with which to form the integrated circuit (IC) structure of the invention. The term substrate is understood to include semiconductor wafers. The term substrate is also used to refer to semiconductor structures during processing, and may include other layers that have been fabricated thereupon. Both wafer and substrate include doped and undoped semiconductors, epitaxial semiconductor layers supported by a base semiconductor or insulator, as well as other semiconductor structures well known to one skilled in the art. The term conductor is understood to include semiconductors, and the term insulator is defined to include any material that is less electrically conductive than the materials referred to as conductors. The following detailed description is, therefore, not to be taken in a limiting sense, and the scope of the present invention is defined only by the appended claims, along with the fall scope of equivalents to which such claims are entitled.

FIG. 1A shows an integrated circuit 100 in which a first transmission line, strip line, or coaxial line 101A interconnects circuit components, e.g. a driver 110 to a receiver 120. FIG. 1A illustrates a first transmission line 101A over a conductive substrate 105. Conventionally, a voltage signal (i.e. a 5 volt signal swing) is provided by the driver 110 to the transmission line 101A. The schematic illustrations in FIG. 1A demonstrate that the transmission line 101A includes a small resistance, shown generally by resistor symbols 102A, 102B, . . . , 102N. Also, the transmission line 101A includes a distributed inductance (L) which is represented generally by inductor symbols 103A, 103B, . . . , 103N. In one embodiment, the driver 110 may be an inverter 110 and the receiver 120 may be an amplifier 120. Capacitor plate symbols 104 are used to schematically represent the capacitive coupling which occurs between the transmission line 101A and the conducting substrate 105. In FIG. 1A, a second transmission line 101B is shown. Capacitor plate symbols 106 are used to schematically represent the capacitive coupling which similarly-occurs between the first transmission line 101A and neighboring transmission lines, e.g. second transmission line 101B.

Figure 1B:
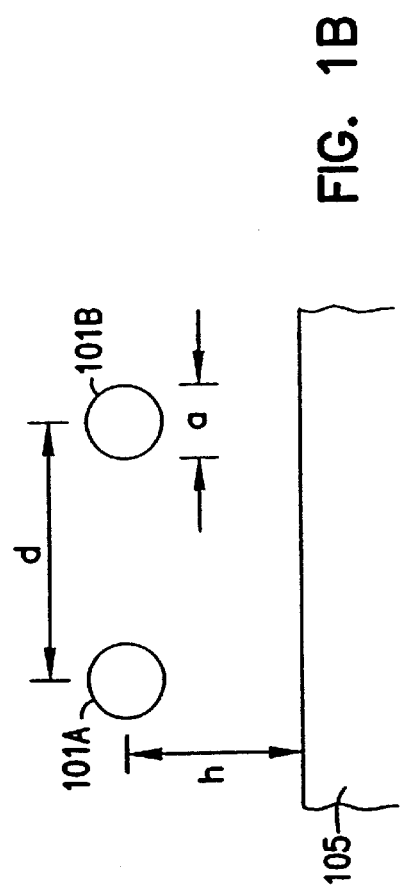
FIG. 1B illustrates a pair of interconnect, or transmission lines displayed perpendicular to the plane of the page.

FIG. 1B illustrates a pair of interconnect, or transmission lines, 101A and 101B, displayed perpendicular to the plane of the page, e.g., in the z axis, separated from a conducting substrate 105. The transmission lines, 101A and 101B are spaced a distance (h) from the conducting substrate 105 and a distance (d) from one another. The transmission lines, 101A and 101B, are shown in a circular geometry, each with a diameter (a). Some general characterizations can be made about the transmission lines, 101A and 101B, in an environment floating or suspended in air. First, each transmission line, 101A and 101B, will have a characteristic impedance ($Z_0$) approximately or generally given by $Z_0 \cong 60 \ln(4h/a)$. Second, each transmission line, 101A and 101B, has a inductance (L) which is $L=5.08 \times 10^{-9} \times \ln(4h/a)$ Henrys/inch (H/inch). Additionally, the two transmission lines, 101A and 101B, will exhibit an interwire mutual inductance (M) which is given by $M=L \times \{1[1+(d/h)^2]\}$. Third, an interwire capacitive coupling (Cint) exists between the two transmission lines, 101A and 101B, and is expressed as $Cint=\pi\epsilon/\cosh^{-1}(d/a)$. Using the trigonometric relationship of $\cosh^{-1}(y) \cong \ln(2y)$, the interwire capacitive coupling can similarly be expressed as $Cint \cong \pi\epsilon/\ln(2 d/a)$. Thus, in this environment, the two transmission lines, 101A and 101B, exhibit an interline capacitance (Cint) given by $Cint=\{0.7/[\ln(2 d/a)]\}$ pico Farads/inch (pF/inch). Lastly, each transmission line, 101A and 101B, will further exhibit capacitive coupling (C) with the conducting substrate 105. In FIG. 1B the transmission lines, 101A and 101B, are spaced a distance (h) from the conducting substrate 105. Using the method of images and the interwire capacitive relationship, $Cint \cong \pi\epsilon/\ln(2 d/a)$, a single transmission line, 101A, over a conducting substrate is given by $C \cong 2\pi\epsilon/\ln(4h/a)$ pF/inch where h=d/2. Thus, in this environment, the two transmission lines, 101A and 101B, exhibit a capacitance, or capacitive coupling (C) with the conductive substrate 105 which is $C \cong \{1.41/[\ln(4h/a)]\}$ pF/inch. The above equations have been presented by assuming that the transmission lines have round or circular geometries. Actual transmission lines on integrated circuits might tend to be more square or rectangular than round due to present lithography techniques. Nevertheless, due to the actual physical size of transmission lines, determined according to minimum lithographic feature techniques, the formulas scale well to square, rectangular or other physical cross sectional geometries for the transmission lines.

The signal rise time (trise) in conventional voltage signaling is normally slow due to the limited ability of the transmission line drivers to supply the large currents needed to charge these capacitances over large voltage swings. The signal rise times are usually much larger than the signal transmission time down the line (tprop). Additionally, if two transmission lines are in close proximity then the voltage swing on one transmission line can induce a large voltage swing or noise voltage on the adjacent transmission line. The noise voltage is determined by the capacitance ratios of interwire capacitance, Cint, to the capacitance of the transmission line with the substrate, C. In other words, the noise voltage is determined according to the ratio Cint/C.

The values of Cint and C can be comparable, dependant upon the insulator thickness (h) under the transmission lines and the spacing between the transmission lines. Emphasis in prior art is placed upon minimizing the capacitance of the transmission line, C, by using thick insulators and low dielectric constant materials. Emphasis is also to some extent placed upon minimizing the interwire capacitance, Cint. Thus, the approach in the prior art results in a noise voltage which can be a large fraction of the signal voltage if the transmission lines are in close proximity and far removed from the substrate by being over thick insulators.

Figure 1C:
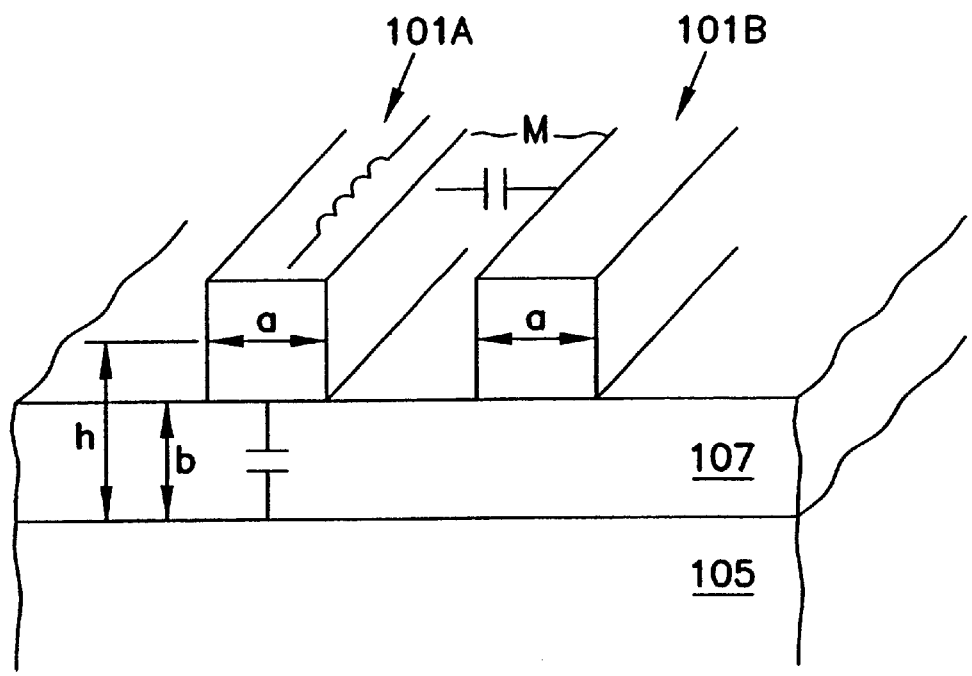
FIG. 1C is a perspective view illustrating a pair of neighboring transmission lines above a conductive substrate according to the teachings of the present invention.

FIG. 1C is a perspective view illustrating a pair of neighboring transmission lines, 101A and 101B, above a conductive substrate 105 according to the teachings of the present invention. The present invention is designed to use current signaling across low impedance transmission lines, 101A and 101B, to reduce signal transmission delay and to improve signaling performance over longer transmission lines. Under conventional voltage signaling the current provided in the transmission lines is too weak to provide clean, accurately detectable current signal. In order to obtain better current signals in the transmission lines the characteristic impedance ($Z_0$) of the transmission lines, 101A and 101B, must be reduced.

To lower the characteristic impedance $Z_0$ of the transmission lines, 101A and 101B, the capacitance coupling (C) between the transmission lines, 101A and 101B, and the conductive substrate 105 is made large. The characteristic impedance (Zo) of the transmission lines, 101A and 101B, can be expressed as $Z_0=\sqrt{L/C}$. Thus, making C large makes the characteristic impedance Zo=Zin, small and similarly makes the voltage division ratio for capacitive coupling small. In the present invention, C increases as the insulator 107 thickness (h) separating the transmission lines, 101A and 1011B, from the ground plane, or substrate 105 is decreased. In FIG. 1C, the transmission lines, 101A and 1011B, are separated a distance (h) from the conducting substrate 105 by an insulating layer 107. In one embodiment, the insulating layer 107 is an oxide layer 107. The capacitive coupling (C) between the transmission lines, 101A and 101B, and the conducting substrate 105 separated by an oxide layer 107 is given as $C \cong 1.66/[\ln(4h/a)]$ pF/cm. Additionally, the inductance (L) for the transmission lines, 101A and 101B, over the oxide layer 107 is $L \cong 2 \times \ln(4h/a)$ nanoHenrys/centimeter (nH/cm). The transmission lines, 101A and 101B, are shown in a square geometry having a width (a). In one embodiment, the insulator 107 thickness (b) is made thinner than the width (a) of the transmission lines, 101A and 101B. The center of the transmission lines, 101A and 1011B, are a distance (h) above the conducting substrate 105. Unlike prior art where the emphasis is placed upon on minimizing transmission line capacitance (C), the opposite is true here where the emphasis is on minimizing characteristic impedance ($Z_0$). In one exemplary embodiment, the transmission 101 has an input impedance ($Z_0$) of approximately equal to 30 ohms.

Figure 1D:
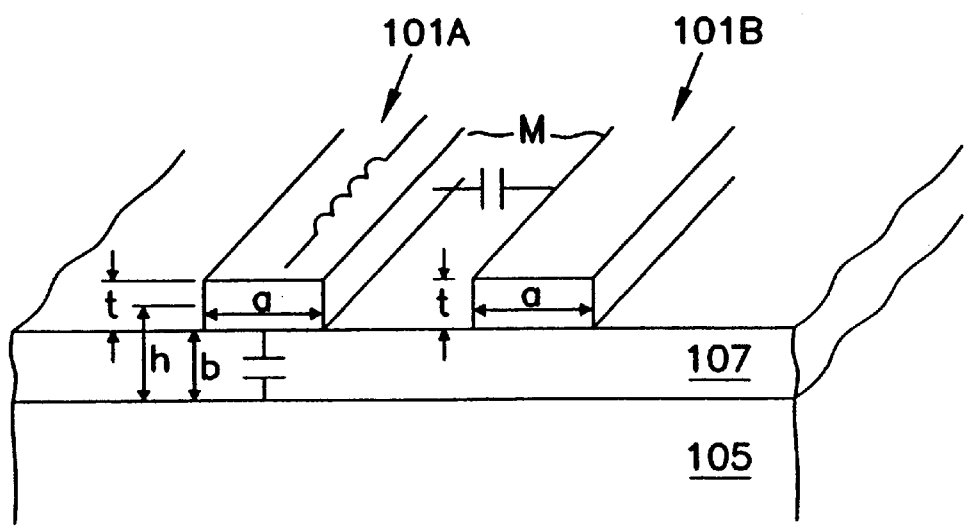
FIG. 1D is a perspective view illustrating another embodiment for a pair of neighboring transmission lines above a conductive substrate according to the teachings of present invention.

FIG. 1D is a perspective view illustrating another embodiment for a pair of neighboring transmission lines, 101A and 1011B, above a conductive substrate 105 according to the teachings of present invention. In this embodiment, a thickness (t) for each of the transmission lines, 101A and 101B, is less than the width (a) of the transmission lines, 101A and 101B. In this embodiment, the reduced thickness (t) of the transmission lines, 101A and 101B further minimizes interwire capacitive coupling (Cint). Again, as in FIG. IC, the insulator 107 thickness (b) over the substrate 105 is made small to increase the capacitive coupling (C) between the transmission lines, 101A and 101B, and the substrate 105. In one embodiment, the thickness (b) of the insulator layer 107 is at most ¾ of the width (a) of the transmission lines, 101A and 101B. The center of the transmission lines, 101A and 101B, are a distance (h) above the conducting substrate 105. Correspondingly, the characteristic impedance Zo of the transmission lines, 101A and 101B, is reduced as Zo is dependent upon C. The transmission lines, 101A and 101B, have a low characteristic impedance ($Z_0$). In one embodiment, the characteristic impedance Z0 of the transmission lines, 101A and 101B, is approximately 30 Ohms. The current steps produced by a driver will induce a voltage step at the load which is the magnitude of the load impedance Zo times this current step. If a 1 mA current is provided to the transmission lines, 101A and 101B, a 30 mV step results on the transmission lines, 101A and 101B.

This embodiment, also results in a fast time constant (RC or ZoC) on the transmission lines, 101A and 101B. In one exemplary embodiment, each transmission line, 101A and 101B, has a length (l) of 0.1 cm or 1000 $\mu$m, each has a width (a) of approximately 1.0 $\mu$m, h is 0.68 $\mu$m, and the insulator layer thickness (b) is approximately 0.2 $\mu$m. In this embodiment, the ln(4 h/a) will be approximately 1. Thus, $C \cong 1.66/[\ln(4\ h/a)]$ pF/cm for a line of 0.1 cm will produce $C \cong 0.2$ pF. If Zo is approximately 30 Ohms, then the time constant (ZoC) is approximately 6 pico seconds (ps). Thus, the low impedance transmission lines, 101A and 101B of the present invention keep the magnitude of the voltage steps on the transmission lines, 101A and 101B, small and the response time (tprop) rapid.

Figure 2:
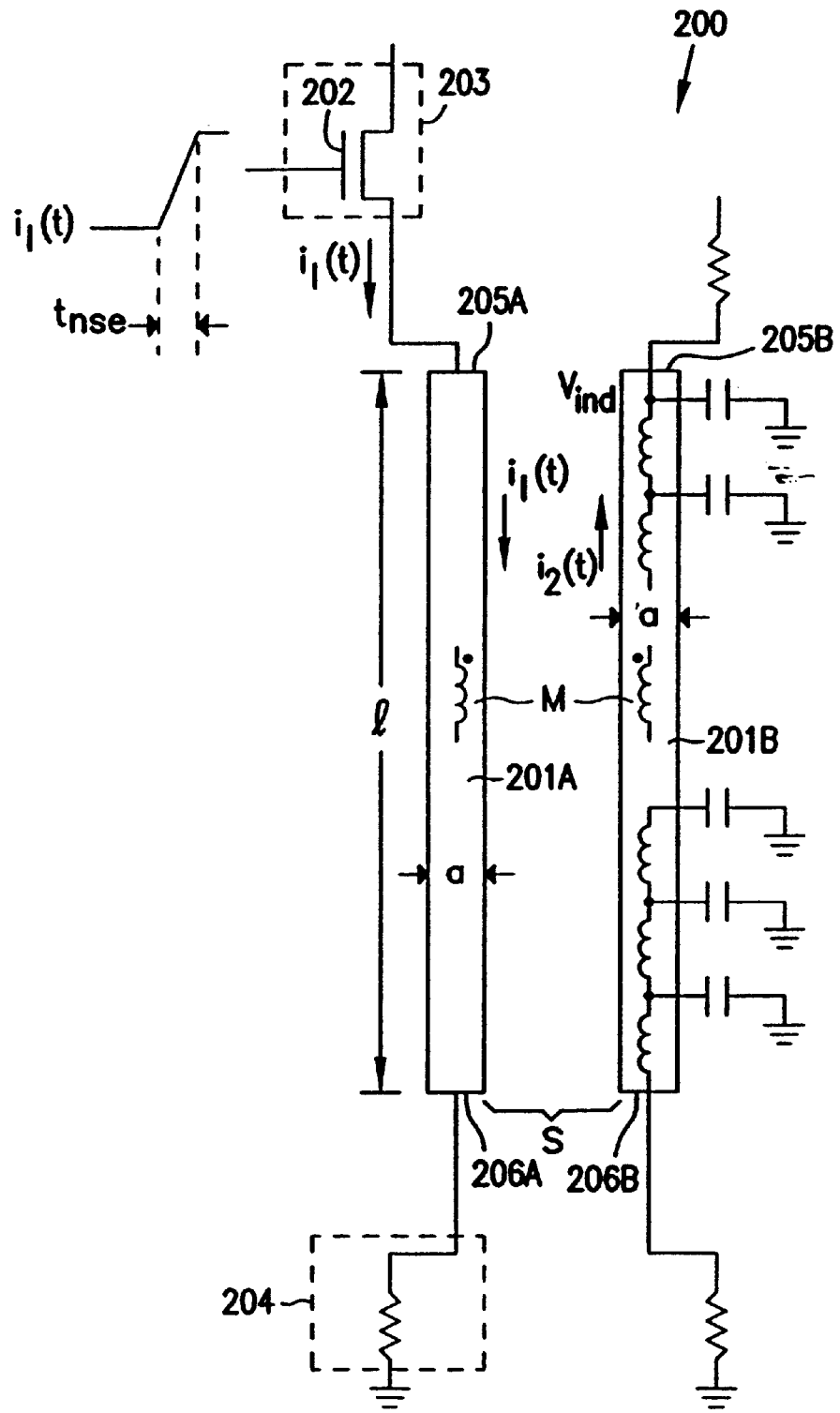
FIG. 2 is a schematic diagram for an interconnection on an integrated circuit according to the teachings of the present invention.

FIG. 2 is a schematic diagram for an interconnection on an integrated circuit 200 according to the teachings of the present invention. The interconnection on the integrated circuit 200 includes a pair of transmission lines, 201A and 201B, in close proximity. The first transmission line 201A is separated by a distance (s) from the second transmission line 201B. The first transmission line 201A and the second transmission line 201B each have a first end, 205A and 205B respectively. In one embodiment, the first end 205A for the first transmission line 201A is coupled to a driver 203. The first transmission line 201A and the second transmission line 201B each have a second end, 206A and 206B respectively. In one embodiment, the second end 206A is coupled to a termination 204 formed using a complementary metal oxide semiconductor (CMOS) process.

Reference to FIG. 2 is useful in explaining the reduced amount of noise current between two transmission lines, 201A and 201B, using the current signaling technique of the present invention. In one embodiment of the present invention, transmission lines, 201A and 201B, have a low characteristic impedances Zo. In one embodiment, the input impedance (Zin) seen by the driver 203 coupling to the first transmission line 201A (in this example the "driven line") is just the characteristic impedance Zo for the first transmission line 201A. In other words, the CMOS termination 204 is impedance matched to the characteristic impedance Zo of the transmission line 201A.

In one embodiment, the first transmission line 201A is separated by approximately 3 $\mu$m from the second transmission line 201B and the transmission lines have a length (l) of at least 500 $\mu$m. In another embodiment the transmission lines, 201A and 201B, have a length (l) of at least 0.1 cm, or 1000 $\mu$m. As in FIGS. 1C and 1D, the transmission lines, 201A and 201B, are separated from a conducting substrate by an insulating layer. In one embodiment, the insulating layer is an oxide layer. In this embodiment, the capacitive coupling (C) between the transmission lines, 101A and 101B, and the conducting substrate is given as $C \cong 1.66/[\ln(4\ h/a)]$ pF/cm. In one exemplary embodiment, each transmission line, 101A and 101B, has a length (l) of 0.1 cm or 1000 $\mu$m, each has a width (a) of approximately 1.0 $\mu$m, and the insulator layer thickness (b) is approximately 0.2 $\mu$m. In this embodiment, the ln(4 h/a) will be approximately 1. Thus, $C \cong 1.66/[\ln(4\ h/a)]$ pF/cm and for a line 0.1 cm long will produce a $C \cong 0.2$ pF. In the same embodiment, the inductance (L) for the transmission lines, 101A and 101B, over the oxide layer is $L \cong 2 \times \ln(4\ h/a)$ nH/cm, or L=0.2 nH for a line 0.1 cm long. In this embodiment, a 1 milli Ampere (mA) current step, $i_1(t)$, is applied to the gate 202 of a transistor driver 203. In one embodiment, the driver is an n-channel source follower driver 203. In this embodiment, the rise time (trise) on the gate 202 of the driver 203 is approximately 100 ps. This is the limiting time on the system response since the signal delay (tprop) down a the transmission line is proportional to $\sqrt{LC}$. For a 0.1 cm transmission line, 201A or 201B, tprop is only 7 ps. A current, $di_1(t)/dt$, of approximately $1 \times 10^7$ A/sec is then produced on the first transmission line 201A.

The noise current $i_2(t)$ induced on the second transmission line 201B by interwire capacitive coupling (Cint) is calculated as approximately $i_2(t) = (Cint) \times (V_1\ step/trise)$. The interwire capacitive coupling (Cint) between the transmission lines, 201A and 201B, separated by an oxide dielectric can be expressed as $Cint \cong 0.46$ pF/cm. Again, for a 0.1 cm transmission line, 201A or 201B, $Cint \cong 0.05$ pF. As described in connection with FIG. 1D, a 1 mA current provided to the first transmission line 201A having a low characteristic impedance Zo of approximately 30 Ohms will result in a corresponding 30 mV Voltage step ($V_1$ step) on the first transmission line 201A. Therefore, if trise is 100 ps a noise current, $i_2(t)$, of approximately 0.015 mA is produced on the second, neighboring, transmission line 201B. This noise current, $i_2(t)$, induced in the second transmission line 201B is a very small percentage, or about 1%, of the signal current $i_1(t)$ provided to the first transmission line 201A. Hence, the signal to noise ratio (SNR) will be large. It can be shown, in general, that a signal to noise ratio (SNR) for the present invention, due to capacitive coupling is of the order (C/Cint) (trise/tprop); where, trise, is the rise time for the current signal and, tprop, the signal propagation time down the first transmission line 201A. The rise time on the signal current, $i_1(t)$, in the first transmission line 201A is fast and just follows the rise time (trise) on the input signal, or 100 ps. The response time of this system utilizing current signals is thus much faster than those using voltage signals.

Reference to FIG. 2 is similarly useful to illustrate the noise voltage signal from magnetic coupling induced in the second transmission line 201B by the signal current in the first transmission line 201A. As shown in FIG. 2, a voltage will be induced in the second transmission line 201B which has a magnitude that depends on the trise, $di_1(t)/dt$, of the current $i_1(t)$ in the driven transmission line 201A, and the mutual inductance coupling (M) between neighboring transmission lines, e.g. 201A and 201B. Each transmission line, 201A and 201B, has an inductance (L). As stated above, $L \cong 0.2$ nH for a 0.1 cm transmission line, 201A and 201B. In one exemplary embodiment, the current $i_1(t)$ in the first transmission line, 201A (in this example the "driven line") rises to 1 mA in 100 ps. A current, $di_1(t)/dt$, of approximately $1 \times 10^7$ A/sec is then produced on the first transmission line 201A. As presented above in connection with FIGS. 1A and 1B, the mutual inductance coupling (M) can be expressed as $M = L \times \{1/[1+(d/h)^2]\}$. In one exemplary embodiment, d is approximately equal to 3 $\mu$m, and h is approximately equal to 0.7 $\mu$m. In this embodiment, M will equate to approximately M=0.02 nano Henrys (nH).

Using the relationship that the induced voltage (Vind) = $M \times di_1(t)/dt$, Vind is approximately equal to 0.2 mV. During this 100 ps time period the induced voltage traveling down the second transmission line 201B just sees the characteristic impedance Zo of the second transmission line 201B. In one embodiment Zo is approximately 30 Ohms, so here, the current induced $i_2(t)$ in the second transmission line is $i_2(t)=Vind/Zo$ or 0.007 mA. This low value current is only approximately one percent (1%) of the signal current $i_1(t)$ on the first transmission line, 201A. Hence, a large signal to noise ratio (SNR) results. In contrast, under the prior technology, if high impedance capacitive loads had been used on high characteristic impedance lines and conventional voltage signaling employed there is typically a large noise voltage between the neighboring transmission lines, 201A and 201B. In the prior technology, the large noise voltage can be about one half as big as signal voltages.

The second transmission line 201B has an equivalently rapid time constant, (L/R) to that of the first transmission line 201A. In the embodiment presented above, the time constant is approximately 7 pico seconds (ps). The noise current $i_2(t)$ in the second transmission line 201B will reach a steady state in that time constant. The noise current stays at this steady state value until the end of trise, in this embodiment 100 ps, at which point $i_1(t)$ stops changing. After this, the noise current in the second line decays away very quickly. Again, when the input impedance seen by the driver 203 is matched to the characteristic impedance Zo of the first transmission line 201A, the signal to noise ratio (SNR) due to inductive coupling between the first transmission line 201A and the second, or neighboring, transmission line 201B is of the order, (L/M) (trise/tprop). In other embodiments, the actual mutual inductance and self inductances may vary from these given values without departing from the scope of the invention.

Figure 3A:
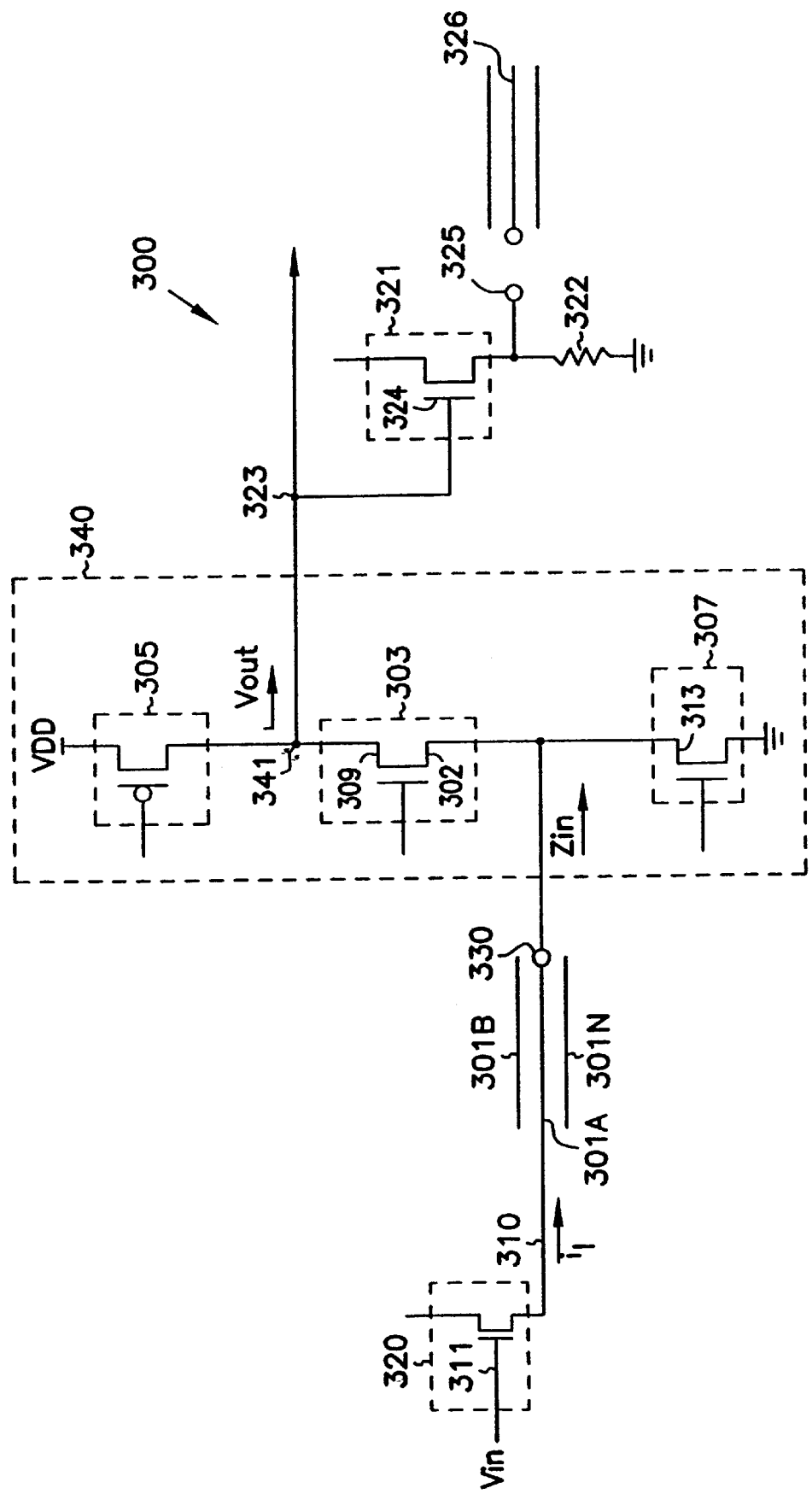
FIG. 3A is a schematic illustration for an integrated circuit, or signaling system according to the teachings of the present invention.

FIG. 3A is a schematic illustration for an integrated circuit, or signaling system 300 according to the teachings of the present invention. In FIG. 3A, a first transmission line 301A is shown having a first end 310 coupled to a first driver 320 and a second end 330 coupled to a CMOS termination 340. FIG. 3A similarly illustrates a number of transmission lines, 301B and 301N, in proximity to the first transmission line 301A. In one embodiment, the second end 330 of the first transmission line 301A is terminated by a CMOS amplifier 340, or cascode amplifier 340. In one embodiment, the first transmission 301A line includes a transmission line described and presented in detail above in connection with FIGS. 1C and 1D. In one embodiment, the input impedance Zin for the CMOS amplifier 340 is matched to the characteristic impedance Zo for the first transmission line 301A. In other words, the impedance looking into the sending end of the first transmission line 301A is just the characteristic impedance Zo of the transmission line 301A. Therefore, the signal delay in the first transmission line 301A will just be the small propagation delay down the first transmission line 301A.

In one embodiment, the first driver 320 is a source follower transistor 320. In this embodiment, the response time $(di_1(t)/dt)$ of a current signal $i_1(t)$ provided by the first driver 320 to the first transmission line 301A will be determined primarily by the longer rise time (trise) of an input voltage (Vin) applied to a gate 311 of the source follower transistor 320. In one embodiment, trise of Vin applied to gate 311 of the source follower transistor 320 is approximately 100 ps. Since the gate capacitance of the source follower is small this can be very fast. In one embodiment, the current signal $i_1(t)$ on the transmission line 301A is converted back to a voltage signal at an output node 341 of the CMOS amplifier 340. In one embodiment, the second end 330 of the first transmission line 301A is coupled to a source region 302 for a first n-channel metal oxide semiconductor (NMOS) transistor 303 of the cascode amplifier 340. According to conventional cascode amplifier operation, a current signal $i_1(t)$ on the transmission line 301A will be input to the source region 302 of the first NMOS transistor 303. This produces an output voltage (Vout) across a p-channel metal oxide semiconductor (PMOS) transistor 305 being used as a load device. As one of ordinary skill in the art will understand, if a cascode amplifier 340 is utilized in which both the NMOS and PMOS transistors, 303 and 305 have the same drain conductance (gd), the input impedance Zin to the cascode amplifier 340 will be Zin=2/gm. Here, $\mu m$ is the transconductance of the NMOS transistor 303. The output voltage, Vout, is the signal current $i_1(t)$ times the drain resistance (1/gd) of the PMOS transistor 305. A large gain (G) is achieved since gd is small. As shown in FIG. 3A, a second NMOS transistor 307 is provided as a current sink or current source. The impedance looking into a drain region 313 of the second NMOS transistor 307, e.g. 1/gd, is very high and does not affect the impedance, Zin.

Figure 3B:
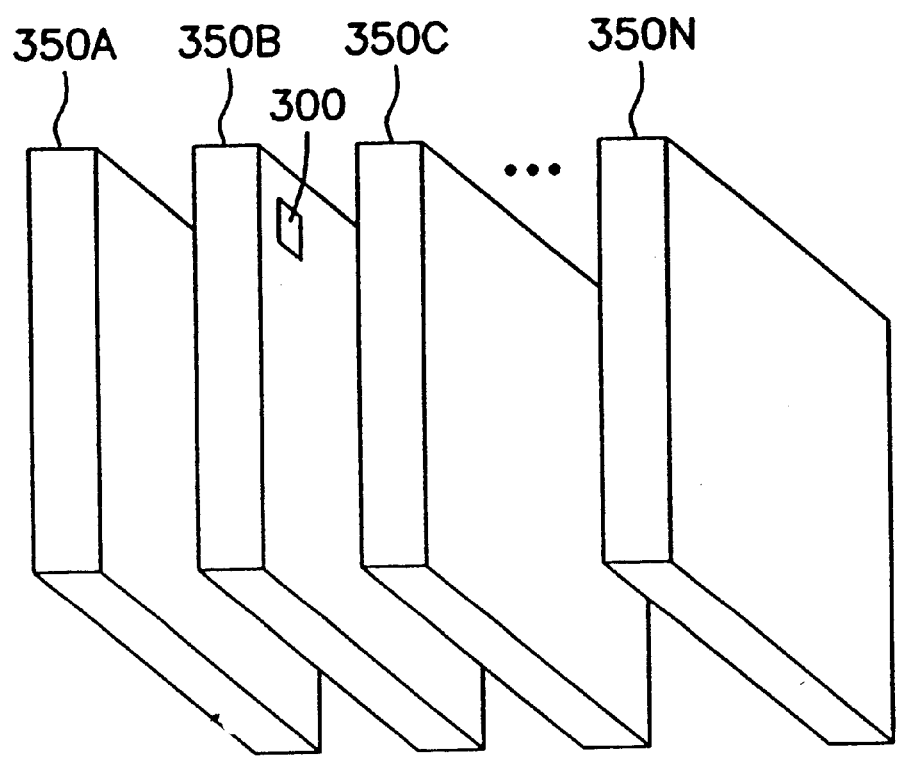
FIG. 3B illustrates an expandable module of linked integrated circuits according to the teachings of the present invention.

FIG. 3B illustrates that additional integrated circuits and other integrated circuit chips, 350A, 350B, 350C, . . . , 350N, e.g. a memory module, can be coupled to the integrated circuit, or signaling system 300, of the present invention. FIG. 3A further illustrates the manner in which the integrated circuit 300, or signaling system 300 couples to the additional integrated circuits and other integrated circuit chips, 350A, 350B, 350C, . . . , 350N. FIG. 3A that to facilitate coupling to the additional integrated circuits and other integrated circuit chips, 350A, 350B, 350C, . . . , 350N a second driver 321 which has an input node 323 is coupled to an output node 341 for the CMOS amplifier 340. In one embodiment, the input node 323 is coupled to a gate 324 for the second driver 321. An output node 325 for the second driver 321 is coupled through another transmission line 326 to an integrated circuit located on another circuit chip, 350A, 350B, 350C, . . . , 350N. The second driver 321 can then transmit the Vout signal on to another integrated circuit chip, shown generally as 350A, 350B, 350C, . . . , 350N in FIG. 3B. In one embodiment, as shown in FIG. 3A, Vout can be coupled to the additional integrated circuits and other integrated circuit chips, 350A, 350B, 350C, . . . , 350N, across a large valued dummy load resistor 322. If additional integrated circuits, 350A, 350B, 350C, . . . , 350N, of FIG. 3B are added, the second driver 321 functions normally. Thus, transmission lines between components of integrated circuits can always be kept correctly terminated with their characteristic impedance to employ the current signaling technique of the present invention.

Figure 4:
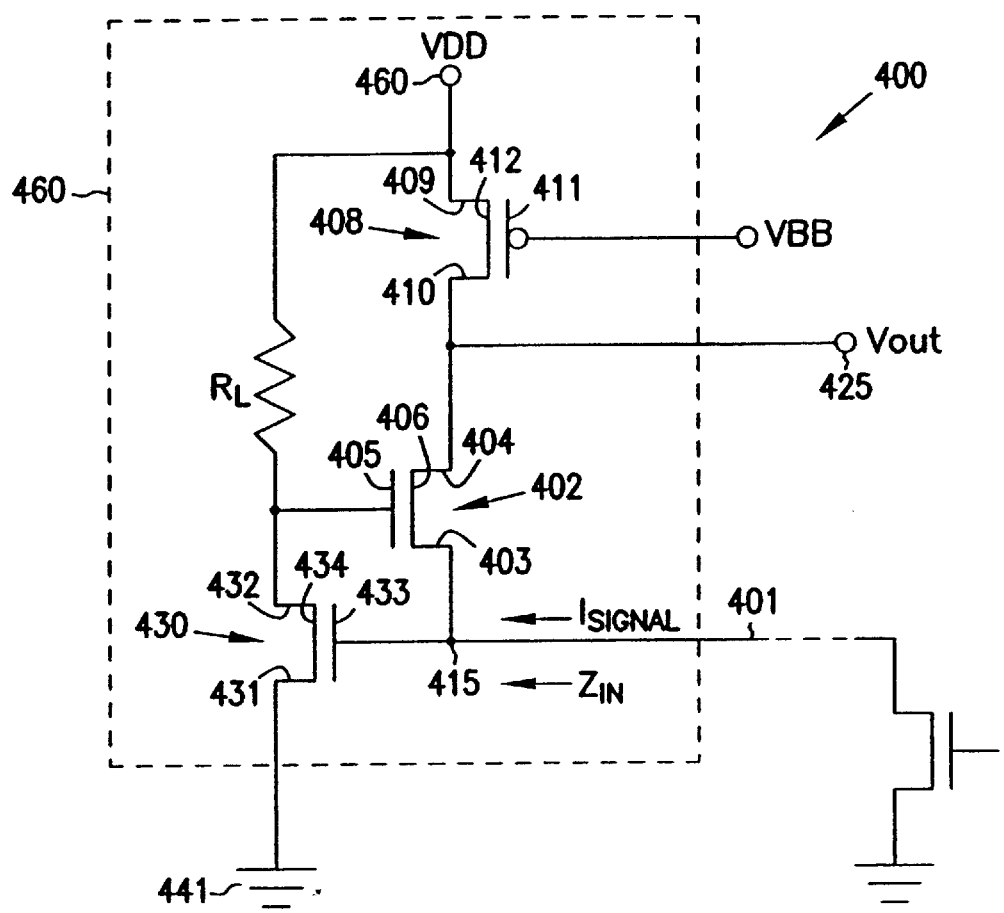
FIG. 4 is a schematic illustration of a novel complementary metal oxide semiconductor (CMOS) amplifier according to the teachings of the present invention.

FIG. 4 illustrates an embodiment for a complementary metal oxide semiconductor (CMOS) amplifier 400 according to the teachings of the present invention. The novel CMOS amplifier 400 provides a termination to an integrated circuit transmission line 401 used in conjunction with the current signaling technique of the present invention. The CMOS amplifier 400 has a low input impedance Zin and provides better impedance matching with the coupled transmission line 401. As shown in FIG. 4, the CMOS amplifier 400 includes a first transistor 402 of a first conductivity type. The first transistor 402 has a source region 403, a drain region 404, and a gate 405 opposing a body region 406. An end 415 of a transmission line 401 is coupled to the source region 403 for the first transistor 402. In one exemplary embodiment, the transmission line 401 includes the transmission lines presented and described above in connection with FIGS. 1C, 1D, and 2. The novel CMOS amplifier 400 includes a second transistor 408 of a second conductivity type. The second transistor 408 has a source region 409, a drain region 410, and a gate 411 opposing a body region 412. The drain region 410 for the second transistor 408 is coupled to the drain region 404 for the first transistor 402. In one embodiment, the first transistor 402 of a first conductivity type is an n-channel metal oxide semiconductor (NMOS) transistor 402 and the second transistor of a second conductivity type is a p-channel metal oxide semiconductor (PMOS) transistor 408.

As shown in FIG. 4, a third transistor 430 of a first conductivity type is included in the CMOS amplifier 400 of the present invention. The third transistor 430 has a source region 431, a drain region 432, and a gate 433 opposing a body region 434. In one embodiment, the drain region 432 for the third transistor 430 is coupled to through a load device (RL) to a positive voltage supply 440. The load device (RL) can be a load resistor (RL), as illustrated in FIG. 4. Alternatively, the load device (RL) can be an another transistor to provide a simple gain stage. The source region 431 for the third transistor 430 is coupled to a lower potential 441. In one embodiment, the lower potential 441 is a ground potential 441. The drain region 432 for the third transistor 430 is coupled to the gate 405 of the first transistor 402. The novel CMOS amplifier 400 can function with small voltage swings since the sense signal is the current flowing through the small input impedance Zin, and not voltage.

According to the teachings of the present invention, the CMOS amplifier 400 employs metal oxide semiconductor (MOS), source follower transistors with a small width to length ratio (W/L) to provide a low input impedance Zin to the CMOS amplifier 400. In the embodiment of FIG. 4, feedback is provided from the third transistor 430 to the gate 405 for the first transistor 402 driven by the current signal (Isignal) on the transmission line 401. This feedback produces a very low input impedance Zin looking into the source region 403 of the first transistor 402. In this embodiment, the input impedance Zin is reduced by the gain of the third transistor 430. As one of ordinary skill in the art will understand, the input impedance Zin looking only into the first transistor 402 is then given as Zin=2/(gm(gmRL+ 1)). For simplicity, the first transistor 402 and the third transistor 430 are assumed to have the same transconductance (gm) and their respective drain conductances (gd) are assumed to be small.

In a conventional current sense amplifier, the signal current is injected into the source region of an n-channel MOSFET, source follower transistor. This produces an output voltage across the p-channel MOSFET being used as a load device. This configuration is typically termed a cascode amplifier. If both n and p-type transistors have the same drain conductance (gd) the impedance is Zin=2/gm. The output voltage (Vout) is just the signal current (Isignal) times the drain resistance (1/gd) of the p-channel MOSFET so a large gain (G) is achieved since gd is small.

The same type of analysis can be applied to the novel CMOS amplifier 400 of FIG. 4. The CMOS amplifier 400 will have an input impedance which is Zin=2/(gm(gmRL+ 1)). The output voltage is then Vout=i₁(t)/gd. In other words, the gain or output voltage remains the same but the input impedance Zin is much lower. This latter characteristic is desirable in matching the characteristic impedance Zo on transmission line 401 for use in the current signaling technique of the present invention. In one embodiment of the present invention, the CMOS amplifier 400 of FIG. 4 is substituted for the conventional cascode amplifier 340 in the signaling system of FIGS. 3A and 3B.

Figure 5:
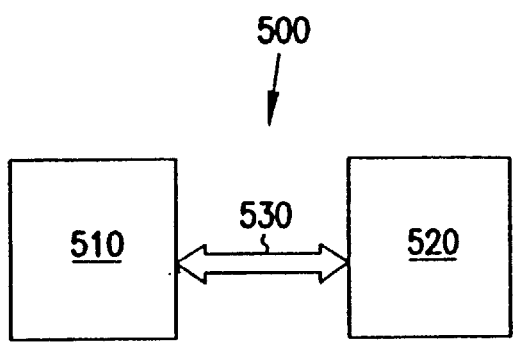
FIG. 5 is a block diagram illustrating an information handling system according to the teachings of the present invention.

FIG. 5 illustrates an information handling system 500 according to the teachings of the present invention. The information handling system 500 includes a central processing unit (CPU) 510 and a random access memory (RAM) 520. A system bus 530 communicatively couples the central processing unit 510 and the random access memory 520. In one embodiment, the random access memory (RAM) includes a CMOS integrated circuit interconnection as presented and described in detail above. The CMOS integrated circuit interconnection includes a first transmission line which has a first end and a second end. An insulator separates the transmission line from a conductive substrate. A driver is coupled to the first end of the transmission line. And, a CMOS amplifier is coupled to the second end of the transmission line. The CMOS amplifier has an input impedance Zin which approximately matches a characteristic impedance Zo of the transmission line and is suitable for the current signaling technique of the present invention.

Figure 6:
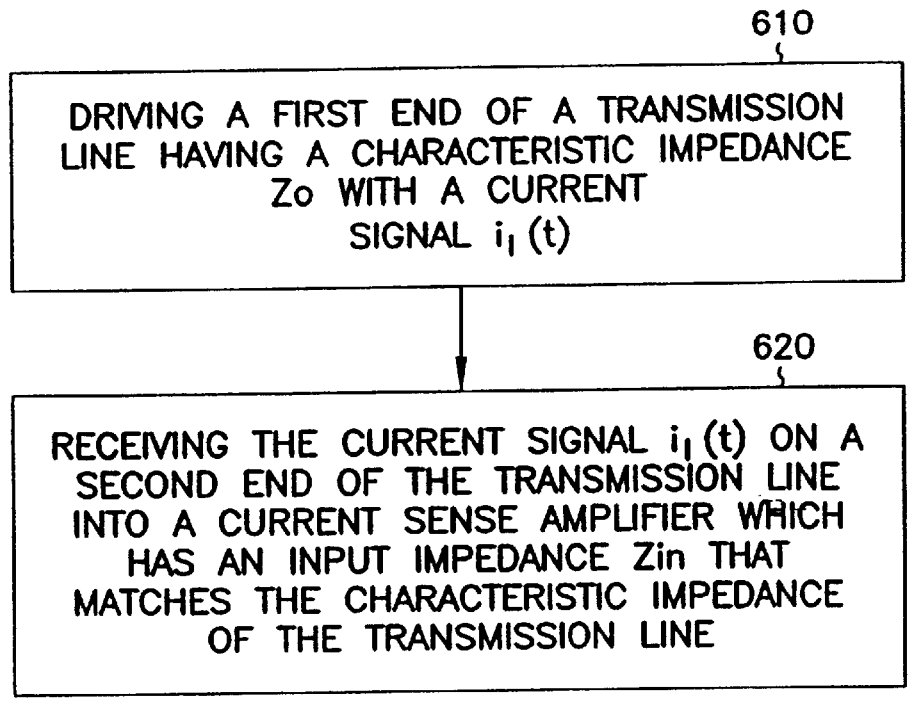
FIG. 6 illustrates, in flow diagram form, a method for transmitting signals over transmission lines on an integrated circuit according to the teachings of the present invention.

FIG. 6 illustrates, in flow diagram, form a method for transmitting signals over interconnection lines on an integrated circuit according to the teachings of the present invention. The method includes driving a first end of a transmission line having a characteristic impedance Zo with a current signal $i_1(t)$ 610. The method further includes receiving the current signal $i_1(t)$ on a second end of the transmission line into a current sense amplifier which has an input impedance Zin which matches the characteristic impedance Zo of the transmission line 620.

In one embodiment, driving the first end of a transmission line having a characteristic impedance includes driving a transmission line having a characteristic impedance Zo of less than 50 Ohms. In this embodiment, driving the first end of the transmission line includes using a source follower transistor, and wherein a rise (charging) time for a voltage waveform on the gate of transistor is less than 200 pico seconds (ps). In an alternate embodiment, driving the first end of the transmission line includes using a source follower transistor having a rise time for a voltage waveform on the gate of transistor of approximately 100 pico seconds (Ps). In this embodiment, driving the first end of a transmission line with a current signal includes driving a 1000 μm transmission line having a signal delay of only 7 pico seconds (ps).

Figure 7:
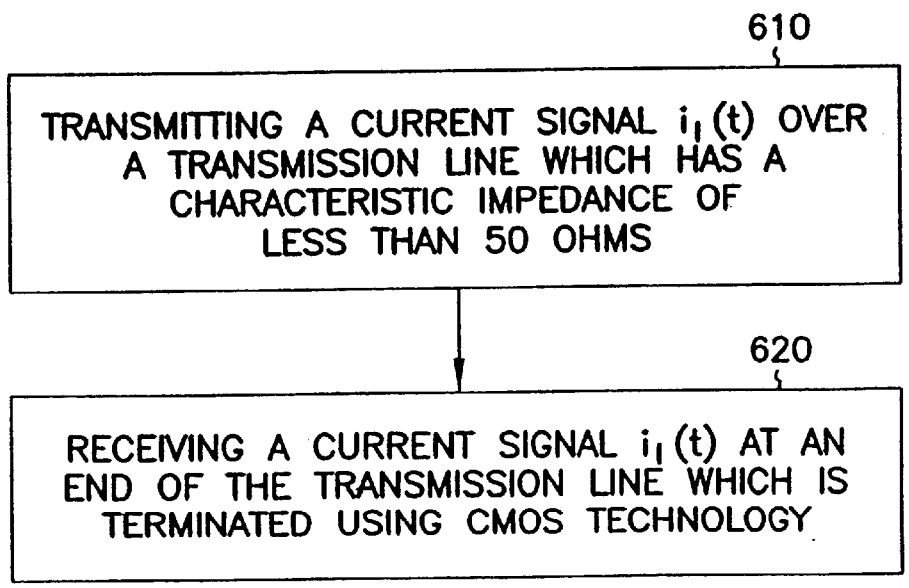
FIG. 7 illustrates, in flow diagram form, another embodiment for a method for transmitting signals on an integrated circuit.

FIG. 7 illustrates, in flow diagram form, another embodiment of a method for transmitting signals on an integrated circuit. The method of FIG. 7 includes transmitting a current signal $i_1(t)$ over a transmission line which has a characteristic impedance of less than 50 Ohms 710. The method includes receiving current signal $i_1(t)$ at an end of the transmission line 720. Receiving the current signal at an end of the transmission line includes terminating the transmission line using a CMOS technology 720. In one embodiment of the method of FIG. 7, terminating the transmission line using a CMOS technology includes terminating the transmission line with a current sense amplifier having an input impedance Zin of less than 50 Ohms.

Figure 8:
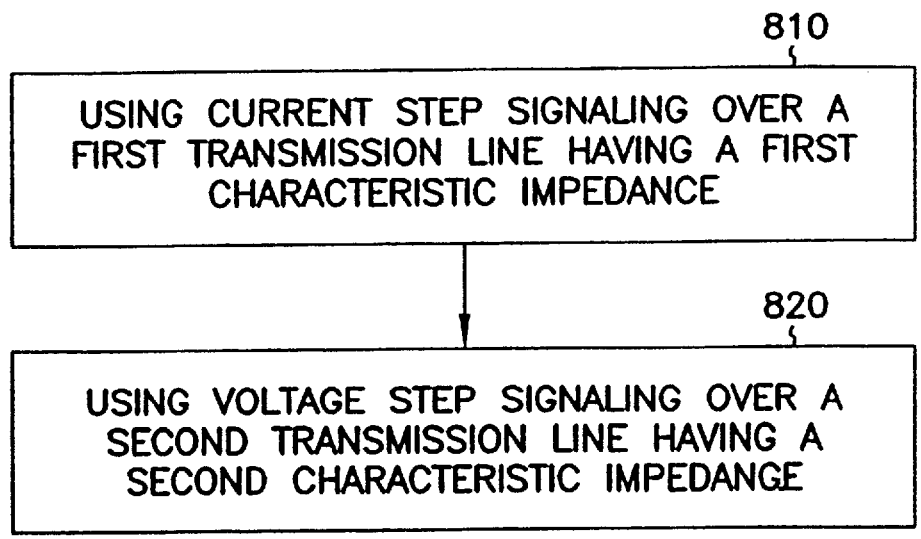
FIG. 8 illustrates, in flow diagram form, a method for signaling across CMOS integrated circuits according to the teachings of the present invention.

FIG. 8 illustrates, in flow diagram form, a method for signaling across CMOS integrated circuits according to the teachings of the present invention. The method includes using current step signaling over a first transmission line having a first characteristic impedance $Z_1$ 810. The first characteristic impedance is less than 50 Ohms. The method further includes using voltage step signaling over a second transmission line having a second characteristic impedance $Z_2$ 820.

In one embodiment, using current step signaling over a first transmission line includes terminating the transmission line with a current sense amplifier having an input impedance Zin of less than 50 Ohms. In this embodiment, using current step signaling over a first transmission line includes using current step signaling over a first transmission line having a length of at least 1000 micrometers (μm).

Figure 9:
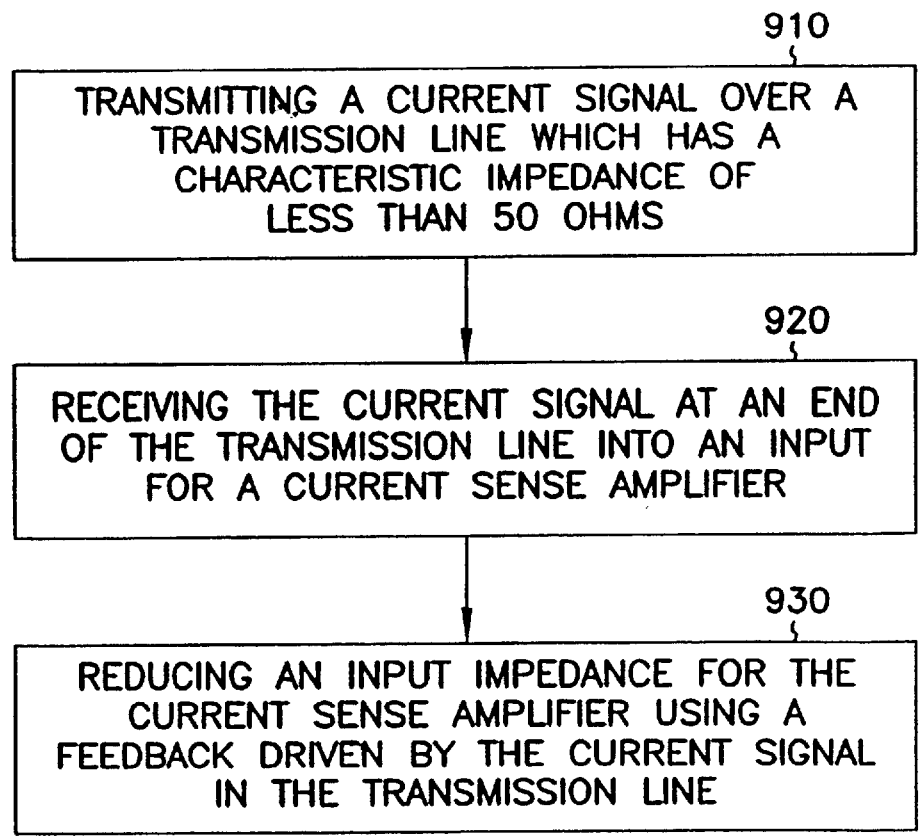
FIG. 9 illustrates, in flow diagram form, a method for transmitting signals on an integrated circuit according to the teachings of the present invention.

FIG. 9 illustrates, in flow diagram form, a method for transmitting signals on an integrated circuit according to the teachings of the present invention. The method includes transmitting a current signal over a transmission line which has a characteristic impedance of less than 50 Ohms 910. The method includes receiving current signal at an end of the transmission line 920. Receiving the current signal at an end of the transmission line includes receiving the current signal into an input for a current sense amplifier. The method further includes reducing an input impedance for the current sense amplifier using a feedback driven by the current signal in the transmission line 930.

In one embodiment of FIG. 9, the current sense amplifier includes a first transistor of a first conductivity type which has a source region, a drain region, and a gate opposing a body region. The end of the transmission line is coupled to the source region for the first transistor. The current sense amplifier includes a second transistor of a second conductivity type which similarly has a source region, a drain region, and a gate opposing a body region. The drain region for the second transistor is coupled to the drain region for the first transistor. The current sense amplifier also includes a third transistor of a first conductivity type which has a source region, a drain region, and a gate opposing a body region. The drain region is coupled to a positive voltage supply, the source region is coupled to a lower potential, and the drain region is coupled to the gate of the first transistor.

Figure 10:
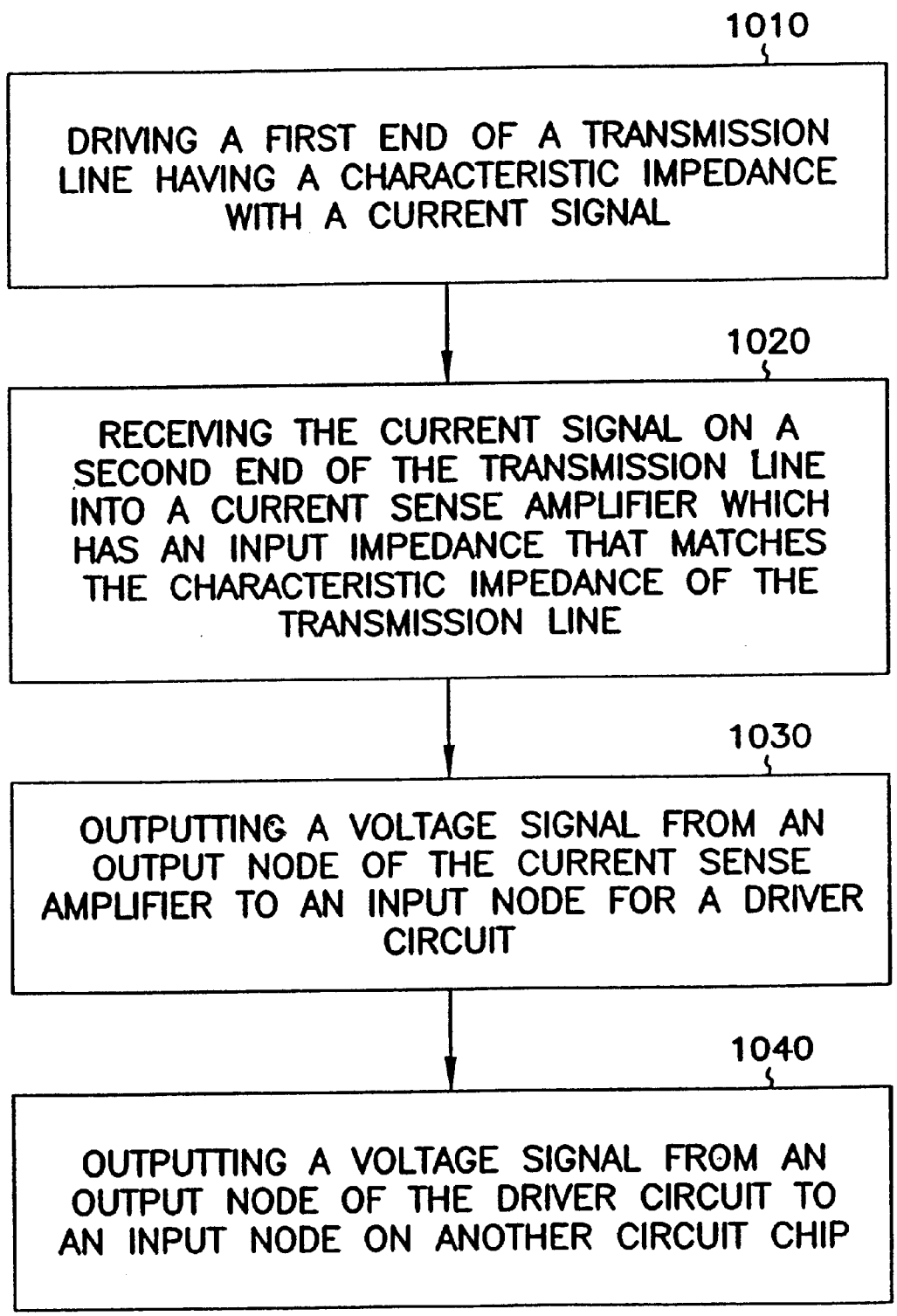
FIG. 10 illustrates, in flow diagram form, a method for operating a signaling system according to the teachings of the present invention.

FIG. 10 illustrates, in flow diagram form, a method for operating a signaling system according to the teachings of the present invention. The method includes driving a first end of a transmission line having a characteristic impedance Zo with a current signal 1010. The method further includes receiving the current signal on a second end of the transmission line into a current sense amplifier input which has an input impedance Zin that matches the characteristic impedance Zo of the transmission line 1020. A voltage signal is output from an output node of the current sense amplifier to an input node for a driver circuit 1030. The method further includes outputting the voltage signal from an output node for the driver circuit to an input node on another circuit chip 1040. In one embodiment, receiving the current signal into a current sense amplifier includes using a feedback in order to reduce the input impedance Zin to the current sense amplifier. In this embodiment, driving the first end of a transmission line includes driving a transmission line having a characteristic impedance Zo of less than 50 Ohms.

Figure 11:
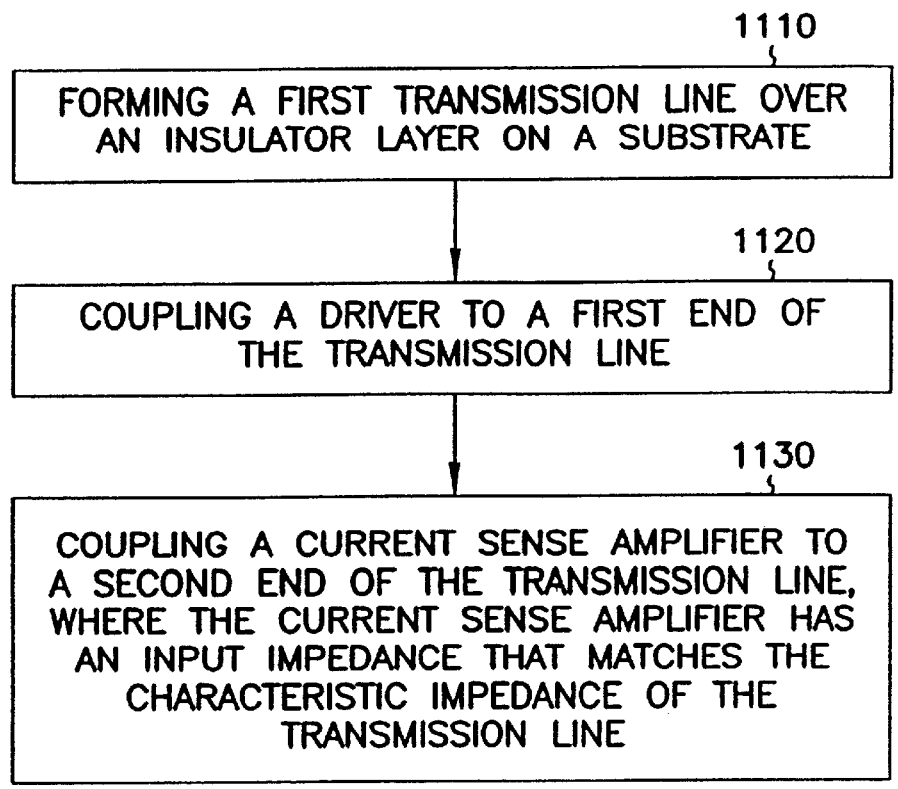
FIG. 11 illustrates, in flow diagram form, a method for forming an interconnection for a CMOS integrated circuit according to the teachings of the present invention.

FIG. 11 illustrates, in flow diagram form, a method for forming an interconnection for a CMOS integrated circuit according to the teachings of the present invention. The method includes forming a first transmission line over an insulator layer on a substrate 1110. The transmission line has a first end and a second end. The method includes coupling a driver to the first end of the transmission line 1120. The method further includes coupling a current sense amplifier to the second end of the transmission line 1130. Coupling a current sense amplifier to the second end includes coupling a current sense amplifier which has an input impedance Zin that matches the characteristic impedance Zo of the transmission line.

Figure 12:
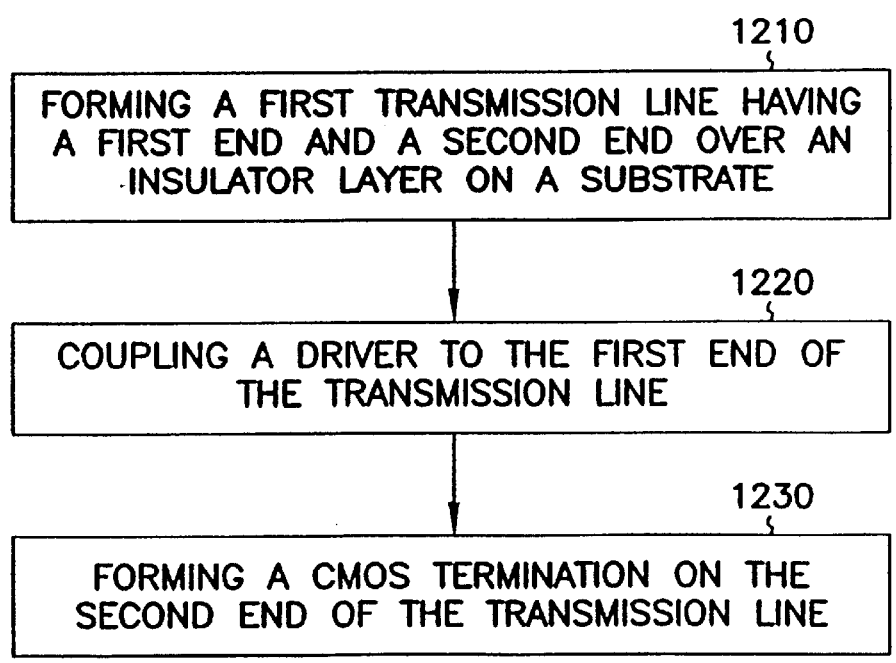
FIG. 12 illustrates, in flow diagram form, another embodiment for a method for forming an interconnection for a CMOS integrated circuit.

FIG. 12 illustrates, in flow diagram form, another embodiment of a method for forming an interconnection for a CMOS integrated circuit. The method of FIG. 12 includes forming a first transmission line, having a first end and a second end, over an insulator layer on a substrate 1210. A driver is coupled to the first end of the transmission line 1220. The method further includes forming a CMOS termination on the second end of the transmission line 1230.

CONCLUSION

Thus, a structure and method are provided for improved transmission lines using a current mode signalling technique on integrated circuits. A first embodiment of this invention provides a current mode signaling technique over low impedance transmission lines. Low impedance transmission lines are more amenable to signal current interconnections over longer interconnection lines. These longer interconnection lines may be on the CMOS integrated circuit itself, an interconnection line between integrated circuits mounted in a module as for instance a memory module, an interposer upon which these integrated circuits are mounted, or on a printed circuit board upon which the integrated circuits are mounted. An interconnection on an integrated circuit is described in which a first end of a transmission line is coupled to a driver. The transmission line of the present invention has a lower than conventional characteristic impedance. The transmission line is terminated at a second end with a CMOS technology to provide impedance matching for the transmission line. In one embodiment, CMOS termination is a current sense amplifier. The impedance matching of the CMOS termination to the transmission line facilitates the current mode signaling technique. This invention minimizes reflections and ringing, cross talk and noise as well as allows for a very fast interconnection signal response.

A second embodiment of the present invention includes a novel current sense amplifier in which feedback is introduced to lower the input impedance of the current sense amplifier. In this embodiment, the novel current sense amplifier is employed together with the current signaling technique of the present invention. The novel low input impedance CMOS circuit described here provides an improved and efficiently fabricated technique for terminating low impedance transmission lines on CMOS integrated circuits. In addition, the novel low input impedance CMOS circuit offers the following advantages: (1) the signal delay depends only on the velocity of light on the line and is easily predictable and reproducible, eliminating or allowing for compensation for signal and/or clock skew, (2) there are fewer reflections at the receiving end of the line which minimizes ringing, and (3) noise signals will be smaller due to weaker coupling between transmission lines resulting in better signal to noise ratios, e.g. the noise current will only be a small fraction of the signal current. Embodiments presented herein are directed toward single ended or single wire signaling, as opposed to differential or two wire interconnections.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. It is to be understood that the above description is intended to be illustrative, and not restrictive. Combinations of the above embodiments, and other embodiments will be apparent to those of skill in the art upon reviewing the above description. The scope of the invention includes any other applications in which the above structures and fabrication methods are used.

The scope of the invention should be determined with reference to the appended claims, along with the full scope of equivalents to which such claims are entitled.

What is claimed is:

1. A method for forming an interconnection for a CMOS integrated circuit, comprising:

forming a transmission line having a first end and a second end over an insulator layer on a substrate;

coupling a driver to the first end of the transmission line; and forming a CMOS termination on the second end of the transmission line includes forming the CMOS termination with an impedance which matches a characteristic impedance of the transmission line.

2. The method of claim 1, wherein forming the CMOS termination on the second end of the transmission line includes terminating the transmission line with a current sense amplifier.

3. The method of claim 2, wherein terminating the transmission line with the current sense amplifier includes terminating the transmission line with the current sense amplifier having an input impedance of less than 50 Ohms.

4. The method of claim 1, wherein forming the transmission line includes forming the transmission line which has a length of at least 1000 ($\mu$m).

5. The method of claim 1, wherein forming the transmission line includes forming the transmission line which has a capacitive coupling value of at least 0.2 pico Farads (pF) between the transmission line and the substrate.

6. An information handling system, comprising:

a central processing unit;

a random access memory; and a system bus for communicatively coupling the central processing unit and the random access memory, the random access memory (RAM) further including a CMOS integrated circuit interconnection, comprising:

a first transmission line which has a first end and a second end;

an insulator separating the transmission line from a conductive substrate;

a driver coupled to the first end of the transmission line; and a current sense amplifier coupled to the second end of the transmission line, wherein the current sense amplifier has an input impedance which matches a characteristic impedance of the transmission line; the current sense amplifier comprising:

a first transistor of a first conductivity type having a source region, a drain region, and a gate opposing a body region, wherein the second end of the transmission line is coupled to the source region for the first transistor;

a second transistor of a second conductivity type having a source region, a drain region, and a gate opposing a body region, wherein the drain region for the second transistor is coupled to the drain region for the first transistor; and a third transistor of a first conductivity type having a source region, a drain region, and a gate opposing a body region, wherein the drain region is coupled to a positive voltage supply and the source region is coupled to a lower potential, and wherein the drain region is coupled to the gate of the first transistor.

7. A CMOS integrated circuit interconnection, comprising:

a first transmission line which has a first and a second end;

an insulator separating the first transmission line from a conductive substrate;

a driver coupled to the first end of the first transmission line; and a current sense amplifier coupled to the second end of the first transmission line, wherein the current sense amplifier has an input impedance which matches a characteristic impedance of the first transmission line.

8. The CMOS integrated circuit interconnection of claim 7, wherein the current sense amplifier has an input impedance of less than 50 Ohms.

9. The CMOS integrated circuit interconnection of claim 7, wherein the first transmission line has a length of at least 1000 ($\mu$m).

10. The CMOS integrated circuit interconnection of claim 7, wherein the interconnection has a capacitive coupling value of at least 0.2 pico Farads (pF) between the transmission line and the conductive substrate.

11. The CMOS integrated circuit interconnection of claim 7, wherein the CMOS integrated circuit interconnection further includes a second transmission line separated from the conductive substrate by the insulator, and wherein the second transmission line is located at least 3 $\mu$m from the first transmission line.

12. The CMOS integrated circuit interconnection of claim 7, wherein the CMOS integrated circuit interconnection includes a signal response time of less than 200 pico seconds (ps).

13. The CMOS integrated circuit interconnection of claim 7, wherein the CMOS integrated circuit interconnection includes a signal to noise ratio of greater than 100.

14. A CMOS integrated circuit, comprising:

a transmission line having a first and a second end, and a characteristic impedance;

a driver coupled to the first end of the transmission line; and a CMOS amplifier coupled to the second end of the transmission line, wherein the CMOS amplifier has an input impedance which matches the characteristic impedance of the transmission line; the CMOS amplifier further comprising:

a first transistor of a first conductivity type having a source region, a drain region, and a gate opposing a body region, wherein the second end of the transmission line is coupled to the source region for the first transistor;

a second transistor of a second conductivity type having a source region, a drain region, and a gate opposing a body region, wherein the drain region for the second transistor is coupled to the drain region for the first transistor; and a third transistor of a first conductivity type having a source region, a drain region, and a gate opposing a body region, wherein the drain region is coupled to a positive voltage supply and the source region is coupled to a lower potential, and wherein the drain region is coupled to the gate of the first transistor.

15. The CMOS integrate circuit of claim 14, wherein the CMOS amplifier further comprises a signal output node coupled to the drain regions for the first transistor and the second transistor, and wherein the signal output node couples to another driver.

16. A signaling system, comprising:
a first transmission line which has a first end, a second end, and a characteristic impedance;
an insulator separating the transmission line from a conductive substrate;
a first driver circuit coupled to the first end of the transmission line;
a CMOS amplifier coupled to the second end of the transmission line wherein the CMOS amplifier has an input impedance which matches the characteristic impedance of the transmission line; and
a second driver circuit, wherein the second driver circuit includes an input node coupled to an output node for the CMOS amplifier, and wherein an output node for the second driver circuit is coupled through a second transmission line to an integrated circuit located on another circuit chip.

17. The signaling system of claim 16, wherein the transmission line includes a width (a) of less than 1.0 µm and a length (l) of at least 0.1 centimeter (cm).

18. The signaling system of claim 17, wherein the insulator is thinner than the width of the transmission line.

19. The signaling system of claim 16, wherein the first transmission line has a characteristic impedance of less than 50 Ohms.

20. The signaling system of claim 16, wherein the system has a capacitive coupling value of at least 0.2 pico Farads (pF) between the first transmission line and the conductive substrate.

21. A method for signaling across CMOS integrated circuits, comprising:
using current step signaling over a first transmission line having a first characteristic impedance, wherein the first characteristic impedance is less than 50 Ohms; and
using voltage step signaling over a second transmission line having a second characteristic impedance.

22. The method of claim 21, wherein using current step signaling over the first transmission line includes terminating the first transmission line with CMOS technology.

23. The method of claim 22, wherein terminating the first transmission line with CMOS technology includes terminating the first transmission line with a current sense amplifier.

24. The method of claim 23, wherein terminating the first transmission line with the current sense amplifier includes terminating the first transmission line with the current sense amplifier which has an input impedance of less than 50 Ohms.

25. The method of claim 21, wherein using current step signaling over the first transmission line includes transmitting a current signal over the first transmission line which has a length of at least 1000 (µm).

26. The method of claim 21, wherein using current step signaling over the first transmission line further includes transmitting a current signal across a first transmission line adjacent to a second transmission line also transmitting a current signal, and wherein transmitting the current signal across the first transmission line includes inducing a noise current in the second transmission line of less than 0.02 milliAmpere (mA).

27. The method of claim 26, wherein transmitting the current signal across the first transmission line includes receiving the current signal at an end of the first transmission line using a CMOS technology.

28. The method of claim 21, wherein using voltage step signaling includes using voltage step signaling over a second transmission line having a length of less 1000 micrometers (µm).

29. A method for transmitting signals on an integrated circuit, comprising:
transmitting a current signal over a first transmission line, wherein the first transmission line has a characteristic impedance of less than 50 Ohms;
receiving the current signal at an end of the first transmission line, wherein receiving the current signal at the end of the first transmission line includes receiving the current signal into an input for a current sense amplifier; and
reducing an input impedance for the current sense amplifier using a feedback driven by the current signal in the first transmission line.

30. The method of claim 29, wherein receiving the current signal into the input impedance for the current sense amplifier includes receiving the current signal into the input having an input impedance of less than 50 Ohms.

31. The method of claim 29, wherein transmitting the current signal over the first transmission line includes transmitting the current signal over the first transmission line which has a length of at least 1000 (µm).

32. The method of claim 29, wherein transmitting the current signal over the first transmission line includes transmitting the current signal over the first transmission line which has a capacitive coupling value of at least 0.2 pico Farads (pF) between the first transmission line and a conductive substrate.

33. The method of claim 29, wherein transmitting the current signal over the first transmission line includes transmitting the current signal across the first transmission line adjacent to a second transmission line also transmitting a current, and wherein a noise current induced in the first transmission line by the current in the second transmission line is less than 0.02 mA.

34. The method of claim 29, wherein receiving the current signal at the end of the first transmission line using a current sense amplifier includes receiving the current signal having a signal to noise ratio of greater than 100.

35. A method for operating a signaling system, comprising:
driving a first end of a transmission line having a characteristic impedance with a current signal;
receiving the current signal on a second end of the transmission line into a current sense amplifier input having an input impedance which matches the characteristic impedance of the transmission line;
outputting a voltage signal from an output of the current sense amplifier to an input for a driver circuit; and
outputting the voltage signal from an output for the driver circuit to an input on another circuit chip.

36. The method of claim 35, wherein receiving the current signal into the current sense amplifier includes using a feedback in order to reduce the input impedance to the current sense amplifier.

37. The method of claim 35, wherein driving the first end of the transmission line includes driving a transmission line having a characteristic impedance of less than 50 Ohms.

38. The method of claim 35, wherein driving the first end of the transmission line includes using a source follower transistor having a rise (charging) time for a voltage waveform on a gate of the transistor of less than 200 pico seconds (ps).

39. The method of claim 35, wherein driving the first end of the transmission line includes using a source follower transistor having a rise time for a voltage waveform on a gate of the transistor of approximately 100 pico seconds (ps).

40. The method of claim 35, wherein driving the first end of a transmission line with the current signal includes driving the transmission line having a length of at least 1000 µm and having a signal delay of only 7 pico seconds (ps).

41. The method of claim 35, wherein driving the first end of the transmission line with the current signal includes transmitting the current signal across the transmission line adjacent to other transmission lines also transmitting a current, and wherein receiving the current signal on a second end of the transmission line into the current sense amplifier includes receiving a current signal having a signal to noise ratio of greater than 100.

42. A method for forming an interconnection for a CMOS integrated circuit, comprising:

forming a first transmission line having a first end and a second end over an insulator layer on a substrate;

coupling a driver to the first end of the transmission line; and coupling a current sense amplifier to the second end of the transmission line, wherein the current sense amplifier has an input impedance which matches a characteristic impedance of the transmission line.

43. The method of claim 42, wherein forming the first transmission line over the insulator layer on the substrate includes forming the first transmission line which has a cross sectional area of approximately 1 micrometer (µm), and wherein the insulator has a thickness of less than 1 micrometer (µm).

44. The method of claim 42, wherein coupling the current sense amplifier to the second end of the transmission line includes coupling the current sense amplifier which has an input impedance of less than 50 Ohms.

45. The method of claim 42, wherein forming the first transmission line includes forming the first transmission line which has a length of at least 500 (µm).

46. The method of claim 42, wherein forming the first transmission line includes forming the first transmission line such that the first transmission line has a capacitive coupling with the substrate of at least 0.1 pico Farads (pF).

47. The method of claim 42, wherein forming the first transmission line includes forming the first transmission line which has a characteristic impedance of less than 50 Ohms (Ω).

48. The method of claim 42, wherein forming the first transmission line includes forming the first transmission line adjacent to a second transmission line.

49. The method of claim 42, wherein forming the first transmission line adjacent to a second transmission line includes forming the first transmission line at least 3 µm from the second transmission line.

50. The method of claim 42, wherein forming the first transmission line includes forming the first transmission line having a signal to noise ratio of greater than 100.

* * * * *

UNITED STATES PATENT AND TRADEMARK OFFICE
CERTIFICATE OF CORRECTION

PATENT NO. : 6,737,887 B2
DATED : May 18, 2004
INVENTOR(S) : Forbes et al.

It is certified that error appears in the above-identified patent and that said Letters Patent is hereby corrected as shown below:

Column 1,
Line 61, delete "de" and insert -- dc --, therefor.

Column 4,
Line 47, delete "fall" and insert -- full --, therefor.

Column 17,
Line 66, after "less" insert -- than --.

Signed and Sealed this

Twenty-seventh Day of July, 2004

JON W. DUDAS
*Acting Director of the United States Patent and Trademark Office*